(12) United States Patent
Kimura

(10) Patent No.: US 10,627,215 B1
(45) Date of Patent: Apr. 21, 2020

(54) OPTICAL SENSOR

(71) Applicant: Mitutoyo Corporation, Kawasaki, Kanagawa (JP)

(72) Inventor: Akihide Kimura, Saitama (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 16/690,705

(22) Filed: Nov. 21, 2019

(30) Foreign Application Priority Data

Dec. 3, 2018 (JP) ................. 2018-226307

(51) Int. Cl.
*G01B 11/02* (2006.01)
*G02B 27/10* (2006.01)
*G02B 27/09* (2006.01)

(52) U.S. Cl.
CPC ........ *G01B 11/026* (2013.01); *G02B 27/1006* (2013.01); *G02B 27/0977* (2013.01)

(58) Field of Classification Search
CPC ......... G01B 11/14; G01B 11/00; G01B 11/02; G01B 11/002; G01B 11/026; G01B 11/24; G01B 11/22; G01B 11/25; G01B 11/26; G01B 11/272; G01B 11/2441; G01B 11/245; G01B 2290/45; G01B 9/02003; G01B 9/02041; G01B 11/005; G01B 11/043; G01B 11/046; G01B 11/0608; G01B 11/0675; G01B 11/27; G01B 17/06; G01B 2290/70; G01B 7/042; G01B 7/14; G01B 9/02; G01B 9/02007; G01B 9/02027; G01B 9/02069; G01B 9/02087; G01B 9/02094; G01B 9/02096; G03F 9/7084
See application file for complete search history.

(56) References Cited

FOREIGN PATENT DOCUMENTS

JP H11-237207 8/1999

*Primary Examiner* — Mesfin T Asfaw
(74) *Attorney, Agent, or Firm* — Rankin, Hill & Clark LLP

(57) ABSTRACT

An optical sensor in which an optical component more inexpensive than a corner cube is used as a measurement target and which has accuracy similar to that of a case where the corner cube is used is provided. An optical sensor 1 includes a light source 2, a dividing unit 6, a retroreflection unit 4 that retroreflects first light and second light divided by the dividing unit 6, a combining unit 7, a light receiving unit 5, and a calculation unit 8. The retroreflection unit 4 includes a first retroreflector 4a that retroreflects the first light in parallel in an opposite direction of an incident direction of the first light by performing reflection thereof twice, a second retroreflector 4b that retroreflects the second light in parallel in an opposite direction of an incident direction of the second light by performing reflection thereof twice, and a third retroreflector 4c that retroreflects the first light, which is emitted from the first retroreflector 4a, to the first retroreflector 4a and retroreflects the second light, which is emitted from the second retroreflector 4b, to the second retroreflector 4b.

19 Claims, 19 Drawing Sheets

OPTICAL SENSOR

CROSS-REFERENCE TO RELATED APPLICATION

This non-provisional application claims priority under 35 U.S.C. § 119(a) from Japanese Patent Application No. 2018-226307, filed on Dec. 3, 2018, the entire contents of which are incorporated herein by reference.

BACKGROUND

Technical Field

An embodiment of the present invention relates to an optical sensor.

Background Art

In a related art, an optical sensor including a light source to emit light, a light receiving unit to receive light from the light source, and a calculation unit to calculate a variation amount in a position due to movement of a measurement object has been known. For example, the optical sensor measures a position or an angle from a variation in interfering light in which two light beams interfere with each other.

In such an optical sensor, two light beams are emitted, and a measurement target to reflect the two light beams to a light receiving unit is included. The measurement target is attached to a measurement object, and moves in the optical sensor in synchronization with movement of the measurement object. The interfering light by the two light beams emitted to the light receiving unit varies due to this movement of the measurement target.

Here, there is a case where one plane mirror is used as the measurement target. However, in a case where one plane mirror is used as the measurement target, when an inclination occurs due to miss-alignment or the like, there is a case where a traveling direction of a reflected light beam varies and interference fringes is generated in interfering light. When the interference fringes is generated, there is a problem that an interference signal by the interfering light received by a light receiving unit is attenuated and an optical sensor cannot measure a position or an angle accurately.

With respect to such a problem, a corner cube is used as a measurement target in a laser interferometer (optical sensor) in Japanese Patent Application Laid-Open No. 11-237207, for example.

A corner cube or a retroreflector is an optical component in which substantially rectangular three plane mirrors are orthogonally connected to each other, for example. For example, a corner cube has a property of reflecting light, which is incident from a light source, in parallel in an opposite direction of an incident direction by reflecting the incident light three times on three plane mirrors.

By performing reflection three times, the corner cube emits the incident light in parallel in an opposite direction when seen in any of three-dimensional directions.

With this property, even when the corner cube is arranged with an inclination, a traveling direction of a reflected light beam does not vary. Thus, no interference fringe is generated from the reflected light beam, and the optical sensor can measure a position or an angle accurately by the corner cube compared to a case where one plane mirror is used in as a measurement target.

SUMMARY OF THE INVENTION

Problems to be Solved by the Invention

Here, in addition to a corner cube, there is a prism as an optical component to reflect incident light in parallel in an opposite direction, for example. The prism emits incident light in parallel in an opposite direction of an incident direction by performing reflection twice on two plane mirrors. However, the prism does not always emit incident light in parallel in an opposite direction in all of three-dimensional directions. Depending on an arrangement angle, the prism emits incident light in parallel in an opposite direction when seen in two directions in the three-dimensional directions. That is, when seen in a remaining one direction different from the above-described two directions in the three-dimensional directions, there is a case where the incident light is not emitted in parallel in the opposite direction. Thus, in order to deal with miss-alignment of a measurement target, a corner cube or a retroreflector that emits incident light in parallel in an opposite direction when seen in any of three-dimensional directions is preferably used.

However, a corner cube or a retroreflector is very expensive. This is because it is necessary to orthogonally connect three plane mirrors to each other and accuracy is needed in order to form a corner cube or a retroreflector. Thus, when a corner cube is used as a measurement target to measure a position or an angle accurately in an optical sensor, there is a problem that a cost is increased.

An embodiment of the present invention is to provide an optical sensor in which an optical component that is more inexpensive than a corner cube is used as a measurement target and which has accuracy similar to that of a case where the corner cube is used.

Means for Solving the Problems

An optical sensor of an embodiment of the present invention includes a light source to emit light, a dividing unit to divide the light from the light source into first light and second light, a retroreflection unit to retroreflect the first light and the second light divided by the dividing unit, a combining unit to combine the first light and the second light reflected by the retroreflection unit into combined light, a light receiving unit to receive the combined light combined by the combining unit, and a calculation unit to calculate a variation amount in a position of a measurement object on the basis of the combined light. The retroreflection unit includes a first retroreflector, a second retroreflector, and a third retroreflector. The first retroreflector retroreflects the first light, which is divided by the dividing unit, in parallel in an opposite direction of an incident direction of the first light by performing reflection thereof twice. The second retroreflector retroreflects the second light, which is light divided by the dividing unit and different from the light reflected by the first retroreflector, in parallel in an opposite direction of an incident direction of the second light by performing reflection thereof twice. The third retroreflector performs retroreflection in a direction different from each of a direction of the first light that enters the first retroreflector from the dividing unit and a direction of the second light that enters the second retroreflector from the dividing unit, retroreflects the first light, which is emitted from the first retroreflector, to the first retroreflector, and retroreflects the second light, which is emitted from the second retroreflector, to the second retroreflector. At least one of the first retroreflector and the second retroreflector is attached to the measurement object. The light receiving unit receives combined light of the first light retroreflected twice by the first retroreflector through the third retroreflector and the second light retroreflected twice by the second retroreflector through the third retroreflector.

According to such an embodiment of the present invention, it is possible to employ a prism as a first retroreflector and a second retroreflector, for example. Also, any optical component can be employed as the third retroreflector as long as the first light emitted from the first retroreflector is retroreflected to the first retroreflector and the second light emitted from the second retroreflector is retroreflected to the second retroreflector. For example, a corner cube that performs retroreflection by performing reflection three times, a prism that performs retroreflection by performing reflection twice, or a glass bead-type corner cube (cat's eye) that performs retroreflection by performing reflection once can be employed. Thus, for example, since a prism that is more inexpensive than a corner cube can be employed as a measurement target (first retroreflector and second retroreflector) in the optical sensor, it is possible to reduce a cost.

Here, as described above, a prism cannot always emit incident light in parallel in an opposite direction in all of the three-dimensional directions. Depending on an arrangement angle, there is a case where incident light is emitted in parallel in an opposite direction in correspondence with two direction among the three-dimensional directions, and it is not possible to correspond to remaining one direction in the three-dimensional directions.

However, according to an embodiment of the present invention, it is possible to perform measurement with accuracy similar to that of a case where a corner cube is used.

That is, even in a case where an optical component that emits incident light in parallel in an opposite direction in correspondence with two directions among the three-dimensional directions is used, light incident from the dividing unit is retroreflected twice on each of the first retroreflector and the second retroreflector through the third retroreflector. Then, by performing retroreflection in a direction different from those of the pieces of light, which enter the first retroreflector and the second retroreflector from the dividing unit, when retroreflection is performed twice, the third retroreflector can cancel an inclination of a light beam which is caused by an inclination of the first retroreflector and the second retroreflector.

Thus, with an optical component such as a prism that is more inexpensive than a corner cube being used as a measurement target, the optical sensor can measure a position or an angle with accuracy similar to that of a case where a corner cube is used.

Here, the third retroreflector is preferably one optical component that retroreflects first light, which is emitted from the first retroreflector, to the first retroreflector and that retroreflects second light, which is emitted from the second retroreflector, to the second retroreflector.

With such a configuration, the third retroreflector is one optical component. Thus, the optical sensor can reduce a cost compared to a case where a plurality of third retroreflector is used.

Here, the third retroreflector preferably retroreflects first light and second light emitted in first retroreflection on the first retroreflector and the second retroreflector, by performing reflection thereof at least twice, from emission positions thereof in a direction of the first light that enters the first retroreflector from the dividing unit and a direction of the second light that enters the second retroreflector from the dividing unit. Also, an incident position with respect to the first retroreflector is preferably offset from the emission position in an orthogonal direction that is orthogonal to the direction of the first light and an incident position with respect to the second retroreflector is preferably offset from the emission position in an orthogonal direction that is orthogonal to the direction of the second light.

With such a configuration, the third retroreflector performs retroreflection by performing reflection at least twice. Thus, for example, a prism that retroreflects incident light by performing reflection twice or a corner cube that retroreflects incident light by performing reflection three times can be employed.

Also, the third retroreflector offsets an incident position with respect to the first retroreflector from an emission position of the first light, which is emitted from the first retroreflector in first retroreflection, in the orthogonal direction that is orthogonal to the direction of the first light, and offsets an incident position with respect to the second retroreflector from an emission position of the second light, which is emitted from the second retroreflector in the first retroreflection, in the orthogonal direction that is orthogonal to the direction of the second light.

With this arrangement, with respect to first retroreflected light and second retroreflected light on the first retroreflector and the second retroreflector, positions of incident light from a light source (dividing unit) and emission light emitted toward a light receiving unit (combining unit) are offset. Thus, for example, the light source and the light receiving unit can be arranged side by side in an offset direction. Thus, it is possible to reduce a space of the optical sensor.

Here, the retroreflection unit includes substantially rectangular two reflectors having a reflection surface to reflect light, and a linear connection portion to orthogonally connect the two reflectors to each other. An arrangement is made in such a manner that a linear direction of the connection portion of the first retroreflector and the second retroreflector is orthogonal to a linear direction of a connection portion of the third retroreflector. By performing reflection twice, the third retroreflector retroreflects first light and second light emitted in first retroreflection on the first retroreflector and the second retroreflector, from emission positions thereof, in a direction of the first light that enters the first retroreflector from the dividing unit and a direction of the second light that enters the second retroreflector from the dividing unit. The third retroreflector offsets, from the emission positions, the incident positions on the first retroreflector and the second retroreflector in the linear direction of the connection portion of the first retroreflector and the second retroreflector.

With such a configuration, for example, a prism that is an optical component to perform retroreflection by performing reflection twice can be employed as the first retroreflector, the second retroreflector, and the third retroreflector.

Also, the third retroreflector can securely cancel an inclination in a traveling direction of a light beam which is caused by an inclination of the first retroreflector and the second retroreflector.

Moreover, light in first and second retroreflection on the first retroreflector and the second retroreflector can be reflected without being made to interfere with each other.

Thus, in the optical sensor, a prism that is more inexpensive than a corner cube can be used as the first retroreflector, the second retroreflector, and the third retroreflector that are included in the retroreflection unit, for example. As a result, it is possible to measure a position or an angle with accuracy equivalent to that of a corner cube while reducing a cost.

Here, it is preferable to include, between a light source and a dividing unit, a reflection unit to reflect light from the light source.

With such a configuration, the optical sensor can adjust an angle of light emitted to the dividing unit since including a reflection unit that reflects light from the light source between the light source and the dividing unit. For example, even in a case where it is not possible to arrange a light source in such a manner as to face a dividing unit, it is possible to emit light to the dividing unit through a reflection unit. Thus, it is possible to increase flexibility in designing and to reduce a space with respect to the optical sensor.

Here, at least one of the first retroreflector and the second retroreflector is preferably an optical angle sensor that is attached to the measurement object and that rotates in synchronization with a rotation of the measurement object.

With such a configuration, at least one of the first retroreflector and the second retroreflector is attached to the measurement object and rotates in synchronization with a rotation of the measurement object. Thus, as the optical angle sensor, the optical sensor can measure a variation amount in an angle due to the rotation of the measurement object.

Here, the first retroreflector and the second retroreflector are preferably attached to the measurement object and rotates in synchronization with the rotation of the measurement object.

With such a configuration, the first retroreflector and the second retroreflector rotate simultaneously for the same angle. With this arrangement, a total variation amount in an angle due to the rotation of the first retroreflector and the second retroreflector becomes double compared to a case where one of the first retroreflector and the second retroreflector is fixed and the other is attached to the measurement object. Then, intensity of combined light and sensitivity of the light receiving unit become twice as high as those of the case where one of the first retroreflector and the second retroreflector is fixed and the other is attached to the measurement object. Thus, the optical sensor that is the optical angle sensor can detect a variation amount in an angle due to the rotation of the measurement object accurately from a highly sensitive signal compared to the case where one of the first retroreflector and the second retroreflector is fixed and the other is attached to the measurement object.

Alternatively, any one of the first retroreflector and the second retroreflector is preferably an optical length-measuring sensor that is attached to a measurement object and that is advanced/retracted in an incident direction of light from the light source in synchronization with movement of the measurement object.

With such a configuration, the optical sensor can measure, as the optical length-measuring sensor, a variation amount in a position due to movement of the measurement object.

Here, in a measurement range of the measurement object, the first retroreflector and the second retroreflector preferably have positions in which an optical length of the first light from a division point of the light, which is from the light source, in the dividing unit to the combining unit through the first retroreflector and an optical length of the second light from the division point of the light, which is from the light source, in the dividing unit to the combining unit through the second retroreflector are the same lengths.

Here, for example, two laser beams divided by a polarizing beam splitter for rotation angle detection of a laser interferometer in Japanese Patent Application Laid-Open No. 11-237207 described above have different optical lengths from a division point of the laser beams in the polarizing beam splitter for rotation angle detection to a combination point of the laser beams in the polarizing beam splitter for rotation angle detection through a corner cube corresponding to each of the laser beams. More specifically, in a case where an optical length of one of the divided laser beams is L, an optical length of the other of the divided laser beams is an optical length 2L that is twice as long as the optical length L of the one laser beam.

A laser light source included in the laser interferometer in Japanese Patent Application Laid-Open No. 11-237207 is an He—Ne laser and a coherent length thereof is a several meters. Thus, even when optical lengths of two laser beams are significantly different from each other, interference occurs. However, for example, in a case where a semiconductor laser in which a coherent length is very short and is a several centimeters is used as a light source, interference does not occur on an irradiation surface on a light receiving signal processing unit when an optical length of one of divided two laser beams is about twice as long as that of the other. Thus, in the laser interferometer in Japanese Patent Application Laid-Open No. 11-237207, in a case where a semiconductor laser is used as a light source, it is necessary to make optical lengths of two laser beams substantially the same in order to avoid restriction due to coherency thereof.

According to a configuration of an embodiment of the present invention, the first retroreflector and the second retroreflector have positions in which an optical length of first light from a division point of light in the dividing unit to the combining unit through the first retroreflector and an optical length of second light from the division point of the light in the dividing unit to the combining unit through the second retroreflector become the same length in a measurement range of the measurement object in the optical sensor. Thus, a difference between the optical length of the first light and the optical length of the second light which difference varies depending on a position of the measurement object can be within a several centimeters. That is, for example, a semiconductor laser with a very short coherent length is used as a light source, it is possible to generate interference on a light receiving surface of the light receiving unit.

Thus, the optical sensor can highly accurately detect a variation amount in a position of the measurement object while avoiding restriction due to coherency of the light source.

Also, the optical sensor can detect a variation amount in a position of the measurement object, for example, from interfering light generated with a semiconductor laser or the like, which is cheaper than an He—Ne laser, as the light source without using the expensive He—Ne laser. Thus, a cost can be reduced.

Here, the dividing unit and the combining unit are a transmission-type diffraction grating having a plurality of gratings that diffracts light from the light source and are preferably provided in one transmission-type diffraction grating.

With such a configuration, since being the transmission-type diffraction grating, the dividing unit and the combining unit can easily divide or combine light from the light source. Also, since the dividing unit and the combining unit are provided in one transmission-type diffraction grating, it is possible to divide and combine light with only one transmission-type diffraction grating. Thus, compared to a case where a plurality of optical components is used, it is not necessary to use complicated optical components in the optical sensor and processing or assembling can be omitted, whereby a cost can be reduced.

Alternatively, one of the dividing unit and the combining unit is preferably a transmission-type diffraction grating having a plurality of gratings that diffracts light from a light source and the other of the dividing unit and the combining unit is preferably a beam splitter.

With such a configuration, it is possible to employ both of the transmission-type diffraction grating and the beam splitter as the dividing unit and the combining unit in the optical sensor. Thus, it is possible to improve flexibility in designing of the optical sensor.

Alternatively, the dividing unit and the combining unit are preferably a beam splitter and provided in one beam splitter.

Here, light transmitted through the plurality of gratings of the transmission-type diffraction grating becomes a plurality of pieces of diffracted light. The plurality of pieces of diffracted light includes signal diffracted light to detect a variation amount in a position of the measurement object and noise diffracted light to be a cause of a noise or an error. In a case where the noise diffracted light is emitted to the light receiving unit, there is a case where an error is generated in a detection result. Thus, it is preferable to prevent emission of the noise diffracted light to the light receiving unit.

However, according to a configuration of an embodiment of the present invention, the dividing unit and the combining unit are the beam splitter. Thus, a plurality of pieces of diffracted light by a transmission-type diffraction grating is not generated. That is, generation of noise diffracted light is prevented by utilization of the beam splitter. Also, a loss is less likely to be generated in light divided or combined by the beam splitter compared to the transmission-type diffraction grating. Moreover, it is possible to divide and combine light from the light source by one beam splitter. Thus, compared to a case where a transmission-type diffraction grating is used as a dividing unit and a combining unit, it is possible to detect a variation amount in a position of the measurement object highly accurately from a highly sensitive signal using light with little loss in the optical sensor. Also, with respect to the optical sensor, it is possible to reduce the number of components and to reduce a cost.

Here, the combining unit has a combining surface that combines first light and second light and has a plurality of gratings juxtaposed in a predetermined direction on the combining surface, and the light receiving unit includes a plurality of light receiving elements juxtaposed in a predetermined direction. Also, the combining unit receives a plurality of pieces of diffracted light through a plurality of gratings, and the calculation unit calculates a variation amount in a position of the measurement object on the basis of a plurality of pieces of diffracted light received by a plurality of light receiving elements.

With such a configuration, the plurality of light receiving elements of the light receiving unit can detect a four-phase signal from interference fringes, for example. For example, from this four-phase signal, the calculation unit can calculate a moving direction of the measurement object and a variation amount in a position due to movement. Thus, the optical sensor can detect a variation amount in a position of the measurement object highly accurately from interference fringes compared to a case where a variation amount in a position of a measurement object is calculated from interfering light.

Alternatively, the combining unit preferably has a combining surface that combines first light and second light and has a plurality of inclined gratings juxtaposed in a predetermined direction on the combining surface and arranged at a predetermined inclination angle with respect to an optical axis of light from the light source. The light receiving unit preferably includes a plurality of light receiving elements juxtaposed in an orthogonal direction orthogonal to the predetermined direction and receives a plurality of pieces of diffracted light through the plurality of inclined gratings. The calculation unit preferably calculates a variation amount in a position of the measurement object on the basis of the plurality of pieces of diffracted light received by the light receiving unit.

With such a configuration, the plurality of light receiving elements of the light receiving unit can detect a four-phase signal from interference fringes, for example. For example, from this four-phase signal, the calculation unit can calculate a moving direction of the measurement object and a variation amount in a position due to movement. Thus, the optical sensor can highly accurately detect, from the interference fringes, a variation amount in a position due to movement of the measurement object compared to a case where a variation amount in a position due to movement of a measurement object is calculated from interfering light.

Here, the combining unit preferably includes a plurality of combining units respectively having different phases, the light receiving unit preferably includes a plurality of light receiving units respectively corresponding to the plurality of combining units, and the calculation unit preferably calculates a moving direction of the measurement object and a variation amount in a position of the measurement object on the basis of pieces of light that are received by the plurality of light receiving units and that have different phases.

With such a configuration, the optical sensor can generate a plurality of pieces of combined light by the plurality of combining units and can detect a four-phase signal, for example. Thus, the optical sensor can highly accurately detect a variation amount in a position due to movement of the measurement object by using the four-phase signal, for example.

Alternatively, the dividing unit may be a diffraction grating having a plurality of gratings. In this case, an optical sensor preferably includes a quarter-wave plate arranged in an optical path of first light or second light, and includes a dividing beam splitter that divides combined light from the combining unit into first divided light and second divided light, a first quarter-wave plate arranged in an optical path of each of the first divided light and the second divided light divided by the dividing beam splitter, a second quarter-wave plate arranged in an optical path of the second divided light through the first quarter-wave plate, a first divided light polarizing beam splitter that divides the first divided light through the first quarter-wave plate into first polarized light and second polarized light, a second divided light polarizing beam splitter that divides the second divided light through the second quarter-wave plate into third polarized light and fourth polarized light, a first light receiving unit that receives light having a phase of zero degrees from the first polarized light, a second light receiving unit that receives light having a phase of 180 degrees from the second polarized light, a third light receiving unit that receives light having a phase of 90 degrees from the third polarized light, and a fourth light receiving unit that receives light having a phase of 270 degrees from the fourth polarized light.

With such a configuration, it is possible to detect a four-phase signal from combined light, for example. Thus, the optical sensor can highly accurately detect a variation amount in a position due to movement of the measurement object by using the four-phase signal, for example.

Alternatively, in a case of being a diffraction grating having a plurality of gratings, the dividing unit preferably includes a quarter-wave plate arranged in an optical path of first light or second light, and includes a first diffraction grating unit that has an irradiation surface on which a plurality of gratings to change combined light from the combining unit into a plurality of pieces of diffracted light is juxtaposed, a second diffraction grating unit that includes a plurality of gratings juxtaposed in a direction orthogonal to a direction, in which the plurality of gratings of the first diffraction grating unit is juxtaposed, on an irradiation surface and that further changes the plurality of pieces of diffracted light from the first diffraction grating unit into a plurality of pieces of diffracted light, and a plurality of polarizers that is arranged in optical paths of the plurality of pieces of diffracted light from the second diffraction grating unit and that changes the plurality of pieces of diffracted light into a plurality of pieces of polarized light respectively having different phases. The light receiving unit preferably includes a plurality of light receiving units respectively corresponding to the plurality of polarizers, and the calculation unit preferably calculates a moving direction of the measurement object and a variation amount in a position of the measurement object on the basis of pieces of light that are received by the plurality of light receiving units and that have different phases respectively.

With such a configuration, compared to a case where the above-described dividing beam splitter, first divided light polarizing beam splitter, and second divided light polarizing beam splitter are included, it is possible to acquire a four-phase signal from the plurality of diffraction gratings without using these optical components, for example. Thus, with respect to the optical sensor, it is possible to reduce a space or a cost while improving accuracy compared to the above-described optical sensor.

Alternatively, the dividing unit is preferably a polarizing beam splitter and preferably includes a dividing beam splitter that divides combined light from the combining unit into first divided light and second divided light, a first quarter-wave plate that is arranged in an optical path of each of the first divided light and the second divided light divided by the dividing beam splitter, a second quarter-wave plate arranged in an optical path of the second divided light through the first quarter-wave plate, a first divided light polarizing beam splitter that divides the first divided light through the first quarter-wave plate into first polarized light and second polarized light, a second divided light polarizing beam splitter that divides the second divided light through the second quarter-wave plate into third polarized light and fourth polarized light, a first light receiving unit that receives light having a phase of 0 degrees from the first polarized light, a second light receiving unit that receives light having a phase of 180 degrees from the second polarized light, a third light receiving unit that receives light having a phase of 90 degrees from the third polarized light, and a fourth light receiving unit that receives light having a phase of 270 degrees from the fourth polarized light.

With such a configuration, the light receiving unit can detect a four-phase signal from combined light, for example. Thus, for example, by using the four-phase signal, the optical sensor can highly accurately detect displacement in a position due to movement of the measurement object even in a case where a beam splitter is used.

Alternatively, the dividing unit is preferably a polarizing beam splitter and preferably includes a first diffraction grating unit having an irradiation surface on which a plurality of gratings to change combined light from the combining unit into a plurality of pieces of diffracted light, a second diffraction grating unit that includes a plurality of gratings juxtaposed in a direction orthogonal to a direction, in which the plurality of gratings of the first diffraction grating unit is juxtaposed, on an irradiation surface and that further changes the plurality of pieces of diffracted light from the first diffraction grating unit into a plurality of pieces of diffracted light, and a plurality of polarizers that is arranged in optical paths of the plurality of pieces of diffracted light from the second diffraction grating unit and that changes the plurality of pieces of diffracted light into a plurality of pieces of polarized light respectively having different phases, the light receiving unit preferably includes a plurality of light receiving units respectively corresponding to the plurality of polarizers, and the calculation unit preferably calculates a moving direction of the measurement object and a variation amount in a position of the measurement object on the basis of pieces of light that are received by the plurality of light receiving units and that have different phases respectively.

With such a configuration, compared to a case where the above-described dividing beam splitter, first divided light polarizing beam splitter, and second divided light polarizing beam splitter are included, it is possible to acquire a four-phase signal without using these optical components, for example. Thus, with respect to the optical sensor, it is possible to reduce a space or a cost while improving accuracy compared to the above-described optical sensor.

DETAILED DESCRIPTION OF THE EMBODIMENTS

First Embodiment

In the following, the first embodiment of the present invention will be described on the basis of FIG. 1 to FIG. 4B.

Figure 1:
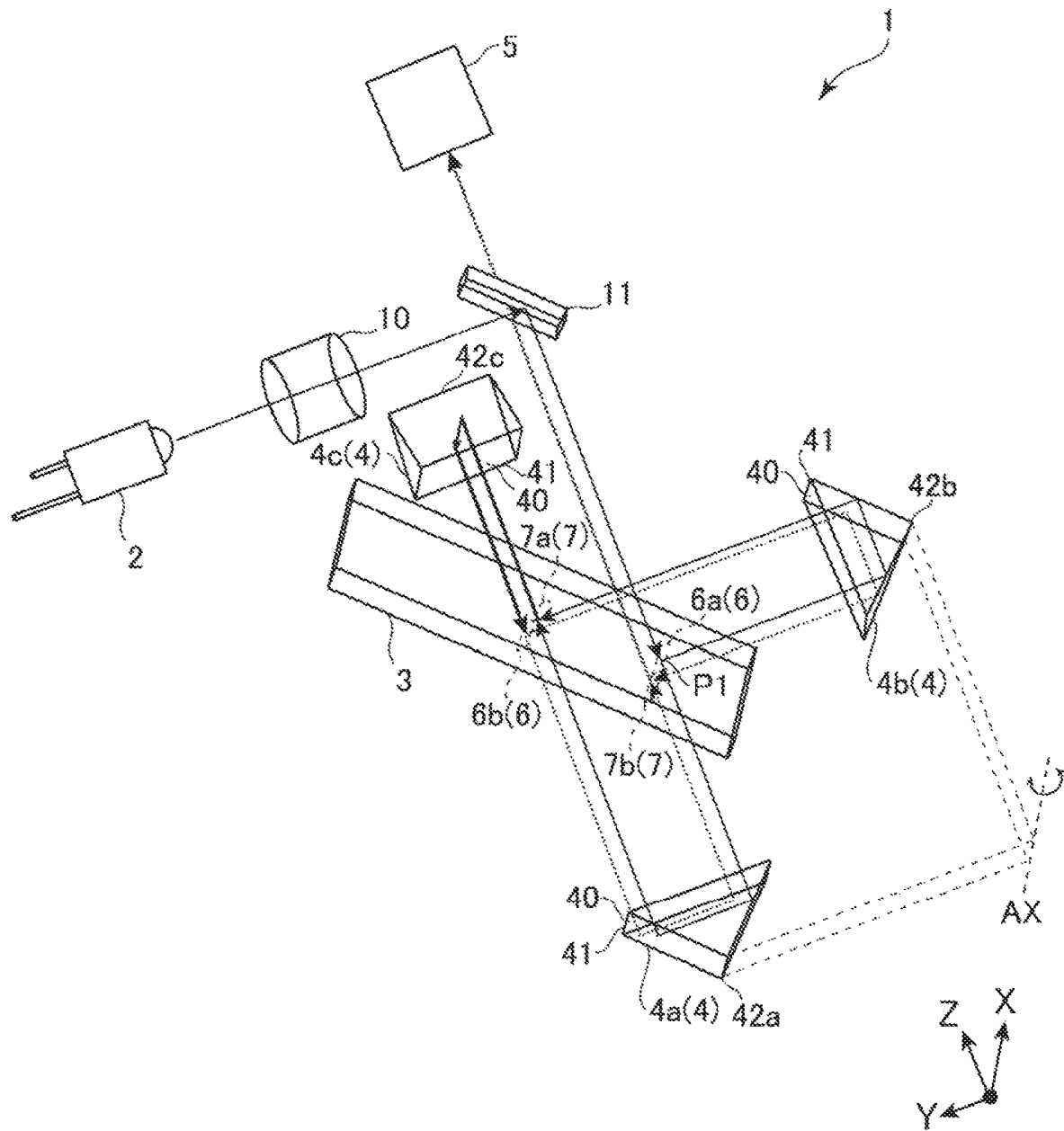
FIG. 1 is a schematic view illustrating an optical sensor according to a first embodiment.

FIG. 1 is a schematic view illustrating an optical sensor according to the first embodiment.

As illustrated in FIG. 1, an optical sensor 1 is an optical angle sensor including a light source 2 to emit light, a beam splitter 3 to divide and combine light, a retroreflection unit 4 to retroreflect light, which is from the light source 2 through the beam splitter 3, in parallel in an opposite direction toward the beam splitter 3 by performing reflection thereof twice, and a light receiving unit 5 to receive light that is reflected on the retroreflection unit 4 and is through the beam splitter 3.

The optical sensor 1 detects a variation amount in a position of a measurement object (not illustrated). More specifically, the optical sensor 1 detects a variation amount in an angle of the measurement object that rotates with a rotating axis AX being an axis. The optical sensor 1 is provided inside a measuring instrument that measures a variation amount in the angle of the measurement object. In the first embodiment, the measurement object and the retroreflection unit 4 rotate with an X axis that is the rotating axis AX being an axis.

Note that in the following description and drawings, an arrow indicates an optical path of light that causes interference at the light receiving unit 5.

Toward the beam splitter 3, the light source 2 emits light having a certain width. The light source 2 is, for example, a semiconductor laser. Note that the light source 2 is not limited to a semiconductor laser and only needs to be a light source having a coherent length of a several centimeters, and may be an He—Ne laser having a coherent length of a several meters, for example.

The beam splitter 3 is a non-polarizing beam splitter and is a plate-type optical component. The beam splitter 3 includes a dividing unit 6 to divide light from the light source 2 into first light and second light, and a combining unit 7 to combine the first light and the second light reflected on the retroreflection unit 4 into combined light. The dividing unit 6 and the combining unit 7 are the beam splitter 3 and are provided in the one beam splitter 3.

The dividing unit 6 that is a non-polarizing beam splitter divides light, which is not polarized on average, into first light and second light instead of dividing the combined light emitted from the light source 2 into S polarized light and P polarized light. Note that the beam splitter 3 may be a polarizing beam splitter, and the dividing unit 6 may divide light from a light source 2 into first light and second light of two polarized light components that are S polarized light that is light of S random polarized light and P polarized light that is light of P random polarized light.

Also, the optical sensor 1 includes a collimator lens 10 to change light from the light source 2 into parallel light, and a reflection unit 11 to reflect the light from the light source 2 between the light source 2 and the dividing unit 6. The reflection unit 11 is a mirror. The collimator lens 10 is arranged between the light source 2 and the reflection unit 11. Note that the collimator lens 10 may not be included in a case where the light source 2 is a light source that can emit parallel light. Also, the reflection unit 11 only needs to be able to reflect the light from the light source 2 and may be a half mirror or a beam splitter instead of the mirror.

Then, the retroreflection unit 4 retroreflects the first light and the second light divided by the dividing unit 6.

The retroreflection unit 4 includes a first retroreflector 4a, a second retroreflector 4b, and a third retroreflector 4c.

The first retroreflector 4a retroreflects the first light, which is divided by the dividing unit 6, in parallel in an opposite direction of an incident direction of the first light by performing reflection twice. That is, the first retroreflector 4a specularly reflects a component in a first direction and retroreflects a component on a plane orthogonal to the first direction. The first light divided by the dividing unit 6 is incident light on the first retroreflector 4a. Note that the first direction is a direction, a correspondence to which is not possible in retroreflection of incident light by an optical component (prism), among three-dimensional directions and a component means any of the three-dimensional directions.

The second retroreflector 4b retroreflects the second light, which is light divided by the dividing unit 6 and different from the light reflected by the first retroreflector 4a, in parallel in an opposite direction of an incident direction of the second light by performing reflection thereof twice. That is, the second retroreflector 4b specularly reflects a component in a second direction and retroreflects a component on a plane orthogonal to the second direction. Second light, which is light divided by the dividing unit 6 and different from the light reflected by the first retroreflector 4a, is incident light on the second retroreflector 4b. Note that the second direction is a direction, a correspondence to which is not possible in retroreflection of incident light by an optical component (prism), among the three-dimensional directions.

The first retroreflector 4a and the second retroreflector 4b are arranged in such a manner that the first direction and the second direction are substantially in parallel. Note that a component in the first direction and a component in the second direction do not necessarily indicate the same component.

Here, the dividing unit 6 includes a first dividing unit 6a to divide light emitted from the light source 2 into first light and second light, and a second dividing unit 6b to divide light through the third retroreflector 4c into first light and second light.

A combining unit 7 includes a first combining unit 7a to combine, into combined light, first light and second light first retroreflection of which is performed on the first retroreflector 4a and the second retroreflector 4b, and a second combining unit 7b to combine, into combined light, first light and second light second retroreflection of which is performed on the first retroreflector 4a and the second retroreflector 4b through the third retroreflector 4c.

The second dividing unit 6b mainly divides the combined light from the first combining unit 7a as the light through the third retroreflector 4c.

Then, the first retroreflector 4a and the second retroreflector 4b have angles that are positions in which an optical length of first light which optical length is from a division point P1 of light from the light source 2 in the first dividing unit 6a of the dividing unit 6 to the second combining unit 7b of the combining unit 7 through the first retroreflector 4a and an optical length of second light which optical length is from the division point P1 of the light from the light source 2 in the first dividing unit 6a of the dividing unit 6 to the second combining unit 7b of the combining unit 7 through the second retroreflector 4b are the same in a measurement range of the measurement object. The first retroreflector 4a and the second retroreflector 4b are attached to the measurement object and rotate in synchronization with a rotation of the measurement object.

Here, it is preferable that a rotating axis of the measurement object and rotating axes of the first retroreflector 4a and the second retroreflector 4b are coaxial. An irradiation position of combined light from the second combining unit 7b which light is emitted to the light receiving unit 5 is usually the same and does not move on a light receiving surface even when the first retroreflector 4a and the second retroreflector 4b rotate. However, in a case where a rotating axis of the measurement object and rotating axes of the first retroreflector 4a and the second retroreflector 4b are not coaxial or a case where no axis is provided in a predetermined range, there is a case where the combined light emitted from the combining unit 7 to the light receiving unit 5 moves on the light receiving surface of the light receiving unit 5 along with a rotation of the first retroreflector 4a and the second retroreflector 4b. Due to the movement of the combined light, there is a possibility that the light receiving unit 5 detects a noise, or the combined light is deviated from a detectable range and a signal cannot be detected. Thus, the rotating axes are preferably coaxial.

The third retroreflector 4c is one optical component that retroreflects first light, which is emitted from the first retroreflector 4a, to the first retroreflector 4a and that retroreflects second light, which is emitted from the second retroreflector 4b, to the second retroreflector 4b. The third retroreflector 4c retroreflects first light and second light emitted in first retroreflection on the first retroreflector 4a and the second retroreflector 4b, from emission positions thereof, in a direction of the first light that enters the first retroreflector 4a from the dividing unit 6 and a direction of the second light that enters the second retroreflector 4b from the dividing unit 6. Then, the third retroreflector 4c offsets, from an emission position, an incident position with respect to the first retroreflector 4a in an orthogonal direction that is orthogonal to the direction of the first light and offsets, from an emission position, an incident position with respect to the second retroreflector 4b in an orthogonal direction that is orthogonal to the direction of the second light.

That is, at least with respect to components in the first direction and the second direction, the third retroreflector 4c retroreflects the first light reflected on the first retroreflector 4a and the second light reflected on the second retroreflector 4b. Then, by a reflection surface 40 provided integrally, the third retroreflector 4c retroreflects the first light emitted from the first retroreflector 4a to the first retroreflector 4a and retroreflects the second light emitted from the second retroreflector 4b to the second retroreflector 4b.

Each of the first retroreflector 4a, the second retroreflector 4b, and the third retroreflector 4c that are included in the retroreflection unit 4 is a prism including two substantially rectangular reflectors 41 having a reflection surface 40 to reflect light, and a linear connection portion 42 that orthogonally connects the two reflectors 41 to each other.

The reflection surface 40 is formed, for example, as a mirror plane. The reflector 41 is a plate-like mirror formed in a substantially rectangular shape. Note that the reflector 41 does not need to be a mirror as long as light can be reflected. The connection portion 42 is formed linearly to orthogonally connect the plurality of reflectors 41 to each other. Thus, light that enters each of the first retroreflector 4a, the second retroreflector 4b, and the third retroreflector 4c is emitted in parallel in an opposite direction by being reflected twice in the prism by the two reflectors 41.

The retroreflection unit 4 is arranged in such a manner that a linear direction of the connection portions 42a and 42b of the first retroreflector 4a and the second retroreflector 4b and a linear direction of the connection portion 42c of the third retroreflector 4c are orthogonal to each other. In the first embodiment, the linear direction of the first connection portion 42a and the second connection portion 42b corresponds to an X axis direction and the linear direction of the third connection portion 42c corresponds to a Y axis direction. Thus, from emission positions of the first light and the second light emitted from the first retroreflector 4a and the second retroreflector 4b in first retroreflection, the third retroreflector 4c offsets incident positions with respect to the first retroreflector 4a and the second retroreflector 4b in the X axis direction that is the linear direction of the connection portions 42a and 42b of the first retroreflector 4a and the second retroreflector 4b.

The third retroreflector 4c specularly reflects a component in a third direction, and retroreflects a component on a plane orthogonal to the third direction. The third retroreflector 4c is arranged in such a manner that the third direction is orthogonal to the first direction and the second direction. The first light and the second light are offset in a direction substantially in parallel with the first direction and the second direction by the third retroreflector 4c and enter the first retroreflector 4a and the second retroreflector 4b. Here, the first direction corresponds to a direction in parallel with the connection portion 42a of the first retroreflector 4a. Also, the second direction corresponds to a direction in parallel with the connection portion 42b of the second retroreflector 4b. Also, the third direction corresponds to a direction in parallel with the connection portion 42c of the third retroreflector 4c.

The offset of the first light and the second light will be described with reference to FIG. 3A to FIG. 4B described later.

The light receiving unit 5 receives combined light combined by the combining unit 7. A photo diode array (PDA) is used as the light receiving unit 5. The PDA is an optical receiver that has a property of being able to measure interfering light, which is emitted to a light receiving surface thereof, at once. Note that the light receiving unit 5 is not limited to a PDA. An arbitrary optical receiver such as a position sensitive detector (PSD) or a charge-coupled device (CCD) may be used.

Also, the light receiving unit 5 receives combined light of the first light retroreflected twice on the first retroreflector 4a through the third retroreflector 4c and the second light retroreflected twice on the second retroreflector 4b through the third retroreflector 4c.

Figure 2:
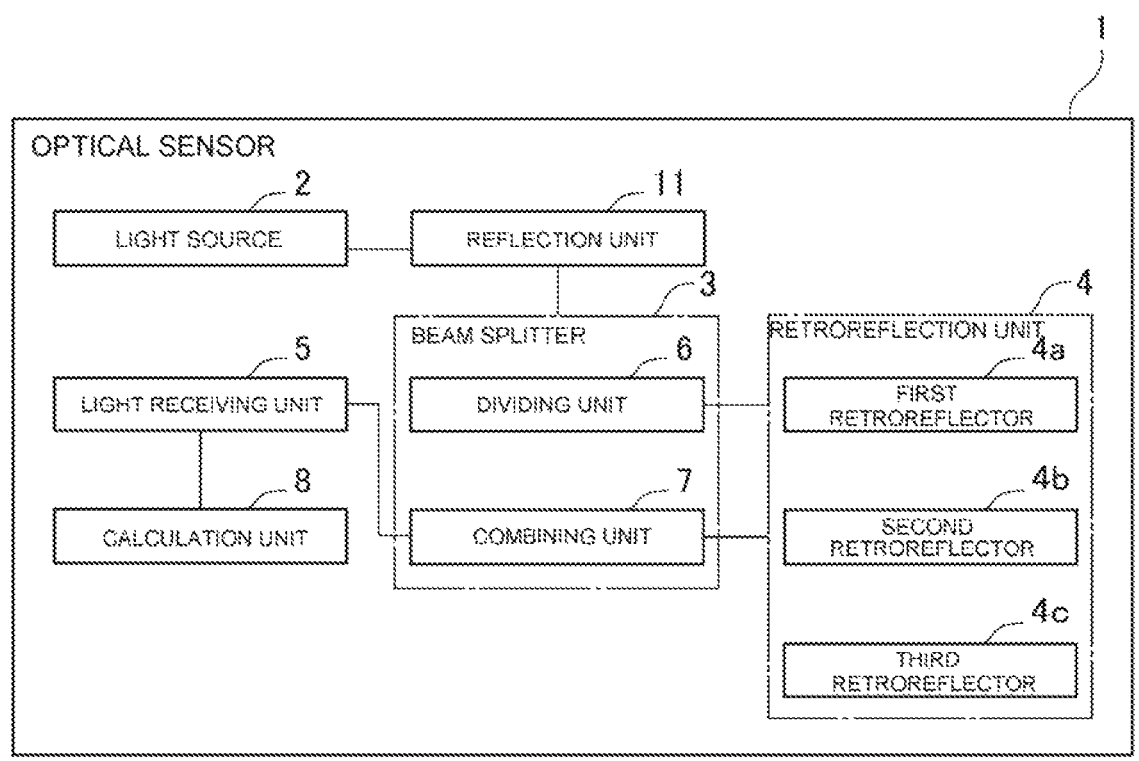
FIG. 2 is a block diagram illustrating the optical sensor.

FIG. 2 is a block diagram illustrating the optical sensor 1.

As illustrated in FIG. 2, the optical sensor 1 includes a calculation unit 8 that calculates a variation amount in a position of a measurement object on the basis of combined light. More specifically, the calculation unit 8 calculates a variation amount in an angle due to a rotation of the measurement object.

The first retroreflector 4a and the second retroreflector 4b rotate in synchronization with the rotation of the measurement object. Along with this, an optical length of each of the first light and the second light also varies. The calculation unit 8 calculates a variation amount in an angle due to a rotation of the measurement object on the basis of interfering light that is generated from the combined light by the rotation of the first retroreflector 4a and the second retroreflector 4b.

Here, an optical path of light in the optical sensor 1 will be described on the basis of FIG. 1.

First, in the optical sensor 1, light emitted from the light source 2 is changed into parallel light by the collimator lens 10 and is reflected by the reflection unit 11 in such a manner that a direction thereof is changed toward the beam splitter 3. Next, the light reflected by the reflection unit 11 is divided into first light and second light by the first dividing unit 6a. Subsequently, the first retroreflector 4a performs first retroreflection of the first light toward the first combining unit 7a. Also, the second retroreflector 4b performs first retroreflection of the second light toward the first combining unit 7a. The first light and the second light reflected toward the first combining unit 7a become combined light and are emitted toward the third retroreflector 4c.

Subsequently, the third retroreflector 4c retroreflects the combined light toward the second dividing unit 6b. Here, after offsetting the combined light in the X axis direction that is the linear direction of the connection portions 42a and 42b of the first retroreflector 4a and the second retroreflector 4b, the third retroreflector 4c performs emission thereof. The offset and retroreflected combined light is divided again into first light and second light by the second dividing unit 6b. Then, the first retroreflector 4a performs second retroreflection of the first light in an offset position toward the second combining unit 7b. Also, the second retroreflector 4b performs second retroreflection of the second light in an offset position toward the second combining unit 7b. The first light and the second light reflected toward the second combining unit 7b become combined light and are emitted to the light receiving unit 5.

Here, the combined light emitted from the second combining unit 7b is offset by the third retroreflector 4c in the X axis direction that is the linear direction of the connection portions 42a and 42b Thus, the combined light passes under the reflection unit 11 (depth direction on plane of paper) and is emitted to the light receiving unit 5. Note that depending on an offset direction of the third retroreflector 4c and an arrangement of the reflection unit 11, the combined light emitted from the second combining unit 7b may pass above the reflection unit 11 and may be emitted to the light receiving unit 5.

Figure 3A:
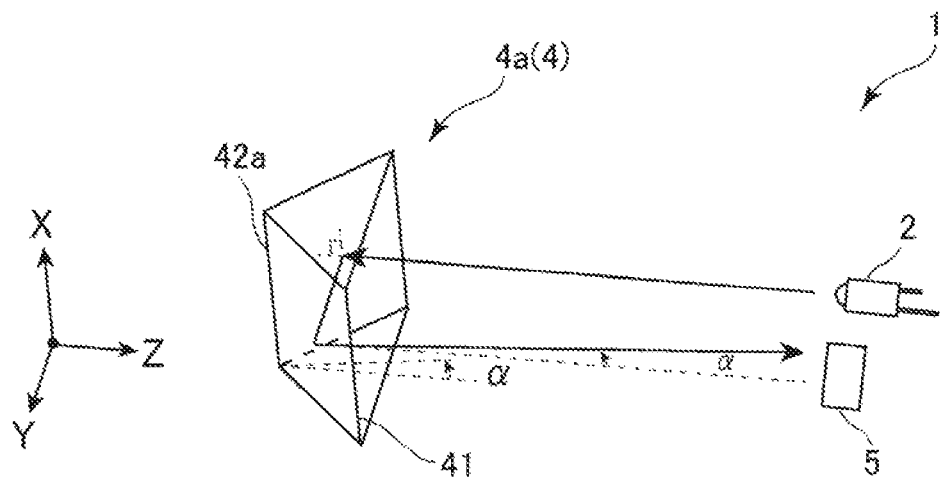
FIG. 3A to FIG. 3C are schematic views illustrating a first retroreflector or a second retroreflector in the optical sensor.
Figure 3B:
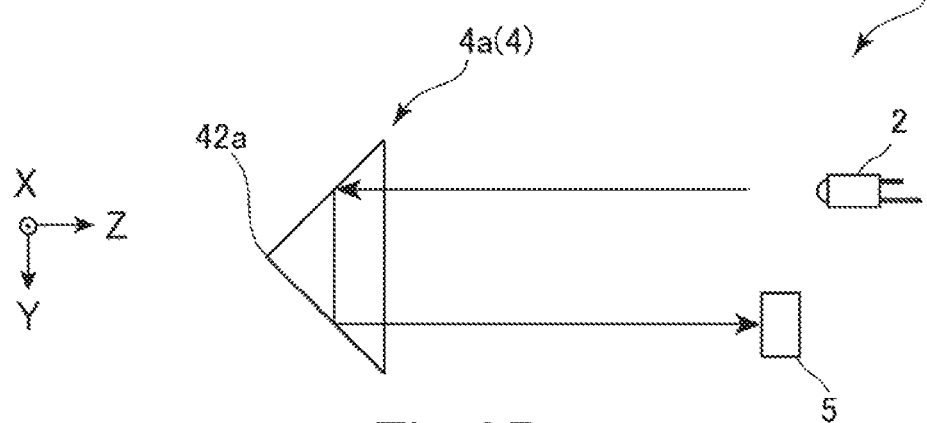
Figure 3C:
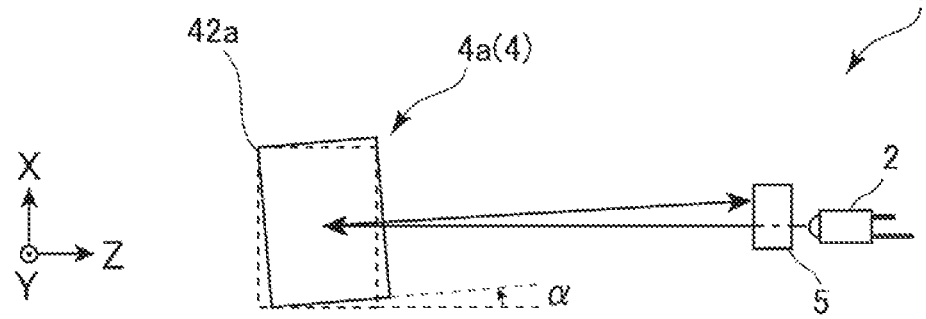

FIG. 3A to FIG. 3C are schematic views illustrating the first retroreflector 4a or the second retroreflector 4b in the optical sensor 1. More specifically, FIG. 3A is a perspective view of the first retroreflector 4a or the second retroreflector 4b. FIG. 3B is a view illustrating the first retroreflector 4a or the second retroreflector 4b seen in the X axis direction. FIG. 3C is a view illustrating the first retroreflector 4a or the second retroreflector 4b seen in the Y axis direction. Note that the collimator lens 10, the reflection unit 11, and the beam splitter 3 are omitted in FIG. 3A to FIG. 3C for convenience of description.

Here, as illustrated in FIG. 3A to FIG. 3C, there is a case where the first retroreflector 4a or the second retroreflector 4b is arranged with an inclination due to miss-alignment or the like. As illustrated in FIG. 3A, when the first retroreflector 4a or the second retroreflector 4b is arranged with an inclination, a traveling direction of first light or second light reflected on the first retroreflector 4a or the second retroreflector 4b varies. When the traveling direction varies, interference fringes is generated in interfering light and an interference signal by the interfering light received by the light receiving unit 5 is attenuated.

Here, as illustrated in FIG. 3B, the first light or the second light is retroreflected in parallel in an opposite direction when seen in the X axis direction. However, as illustrated in FIG. 3C, the first light or the second light the traveling direction of which varies is emitted in a manner of being inclined for an inclination a of the first retroreflector 4a or the second retroreflector 4b when seen in the Y axis direction. That is, the first retroreflector 4a and the second retroreflector 4b can perform retroreflection in the Y axis direction but cannot perform retroreflection in the X axis direction. The third retroreflector 4c has a function of canceling and correcting the inclination a of the first light or the second light due to the inclination a of the first retroreflector 4a or the second retroreflector 4b.

Figure 4A:
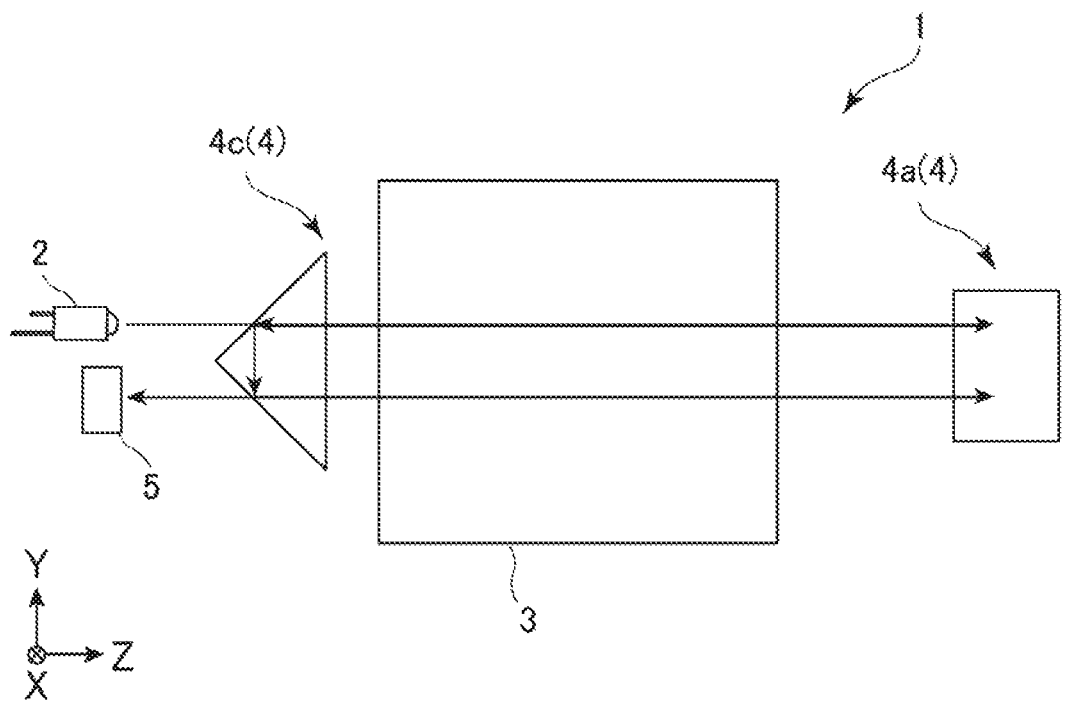
FIG. 4A and FIG. 4B are schematic views illustrating a function of a third retroreflector in the optical sensor.
Figure 4B:
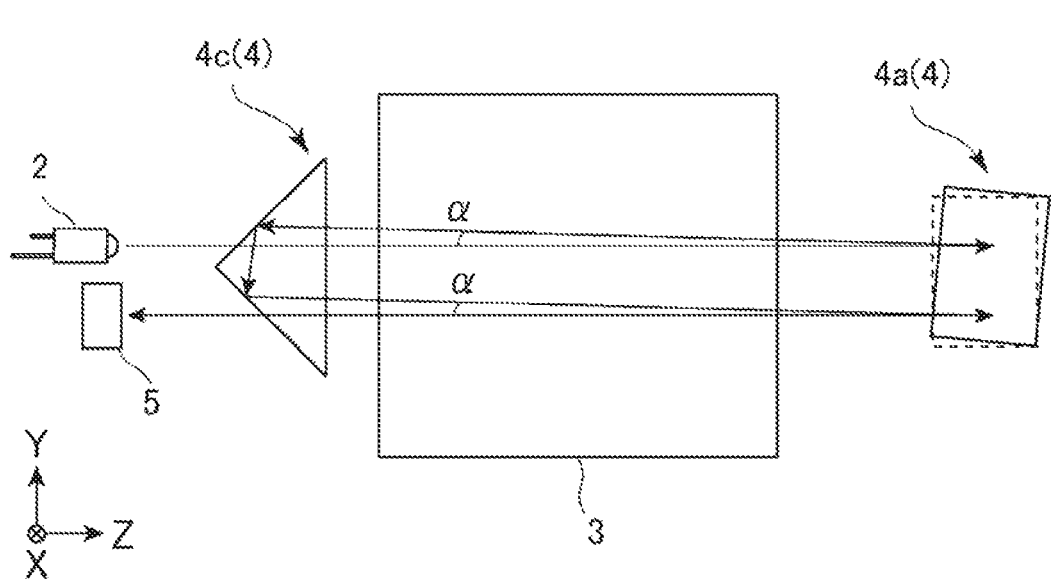

FIG. 4A and FIG. 4B are schematic views illustrating the function of the third retroreflector 4c in the optical sensor 1. More specifically, FIG. 4A is a view illustrating a state of when the first retroreflector 4a or the second retroreflector 4b is arranged normally. FIG. 4B is a view illustrating a state of when the first retroreflector 4a or the second retroreflector 4b is arranged with an inclination. Note that the collimator lens 10 and the reflection unit 11 are omitted in FIG. 4A and FIG. 4B for a convenience of description.

As illustrated in FIG. 4A, when the first retroreflector 4a or the second retroreflector 4b is arranged normally, optical paths in incidence and emission of an optical path of the first light or the second light through the first retroreflector 4a or the second retroreflector 4b become the same when seen in the Y axis direction. The third retroreflector 4c offsets light in a +X axis direction in order to offset positions of first and second retroreflection on the first retroreflector 4a and the second retroreflector 4b.

As illustrated in FIG. 4B, when the first retroreflector 4a or the second retroreflector 4b is arranged with an inclination for a, the third retroreflector 4c performs an offset in the X axis direction, in which the first retroreflector 4a and the second retroreflector 4b cannot perform retroreflection, and performs retroreflection. With this arrangement, the inclination a of the light due to the inclination a of the first retroreflector 4a and the second retroreflector 4b can be corrected.

More specifically, the third retroreflector 4c offsets the first light and the second light in the X axis direction with the inclination a being kept, and retroreflects the first light and the second light. When seen from the first retroreflector 4a and the second retroreflector 4b, the light emitted with the inclination a becomes incident again with the inclination a identical to that in the emission.

For example, in a case where the first retroreflector 4a is inclined, the first light that enters the first retroreflector 4a from the first dividing unit 6a (see FIG. 1) is emitted, with the inclination a, toward the third retroreflector 4c. By the third retroreflector 4c, the first light enters the first retroreflector 4a again with the inclination a that is identical to that in the emission being kept. Then, the first light is emitted from the first retroreflector 4a in parallel in an opposite direction of the first light in the incidence from the first dividing unit 6a to the first retroreflector 4a. That is, when retroreflection is performed twice on the first retroreflector 4a through the third retroreflector 4c, the inclination a of the first light which occurs due to the inclination a of the first retroreflector 4a is canceled. A case where the second retroreflector 4b is inclined is in a similar manner.

Thus, since the third retroreflector 4c that cancels an inclination a of a light beam due to an inclination a of the first retroreflector 4a and the second retroreflector 4b is included, the optical sensor 1 can measure a position or an angle without generating interference fringes due to a variation in a traveling direction of the reflected light beam.

According to such a first embodiment, the following actions and effects can be acquired.

(1) The first retroreflector 4a and the second retroreflector 4b retroreflect first light and second light, which are divided by the dividing unit 6, in parallel in an opposite direction of an incident direction thereof by reflecting the first light and the second light twice. Thus, a prism can be employed. Also, any optical component can be employed as the third retroreflector 4c as long as first light emitted from the first retroreflector 4a is retroreflected to the first retroreflector 4a and second light emitted from the second retroreflector 4b is retroreflected to the second retroreflector 4b. In the first embodiment, a prism is employed as the third retroreflector 4c. Thus, for example, since a prism that is more inexpensive than a corner cube can be employed as each of the first retroreflector 4a and the second retroreflector 4b that are the measurement targets, it is possible to reduce a cost in the optical sensor 1.

(2) Even in a case where a prism that emits incident light in parallel in an opposite direction in correspondence with two directions among three-dimensional directions is used as the retroreflection unit 4, the optical sensor 1 can cancel an inclination of a light beam caused by an inclination of the first retroreflector 4a and the second retroreflector 4b. Thus, with a prism that is more inexpensive than a corner cube being used as a measurement target, the optical sensor 1 can measure a position or an angle with accuracy similar to that of a case where a corner cube is used.

(3) The third retroreflector 4c is one optical component. Thus, a cost of the optical sensor 1 can be reduced compared to a case where a plurality of third retroreflector 4c is used.

(4) With respect to light in first retroreflection and light in second retroreflection on the first retroreflector 4a and the second retroreflector 4b, the third retroreflector 4c offsets positions of incident light from the light source 2 (dividing unit 6) and emission light emitted toward the light receiving unit 5 (combining unit 7). Thus, the light source 2 and the light receiving unit 5 can be arranged side by side in the X axis direction that is an offset direction. Thus, it is possible to reduce a space of the optical sensor 1.

(5) In the retroreflection unit 4, a prism can be employed as each of the first retroreflector 4a, the second retroreflector 4b, and the third retroreflector 4c.

(6) The retroreflection unit 4 is arranged in such a manner that a linear direction of the connection portions 42a and 42b of the first retroreflector 4a and the second retroreflector 4b and a linear direction of the connection portion 42c of the third retroreflector 4c becomes orthogonal to each other. Thus, the third retroreflector 4c can securely cancel an inclination in a traveling direction of a light beam which inclination is generated by an inclination of the first retroreflector 4a and the second retroreflector 4b.

(7) The third retroreflector 4c retroreflects first light and second light in such a manner that the first light and the second light are offset, from emission positions thereof, in the X axis direction that is the linear direction of the connection portions 42a and 42b of the first retroreflector 4a and the second retroreflector 4b. Thus, the pieces of light in the first and second retroreflection on the first retroreflector 4a and the second retroreflector 4b can be reflected without being made to interfere with each other.

Thus, for example, a prism that is more inexpensive than a corner cube can be used as each of the first retroreflector 4a, the second retroreflector 4b, and the third retroreflector 4c that are the retroreflection unit 4 in the optical sensor 1.

As a result, it is possible to measure a position or an angle with accuracy equivalent to that of a corner cube while reducing a cost.

(8) Since the reflection unit 11 that reflects light from the light source 2 is included between the light source 2 and the dividing unit 6, the optical sensor 1 can adjust an angle of light emitted to the dividing unit 6. Even in a case where it is not possible to arrange the light source 2 in such a manner as to face the dividing unit 6, it is possible to emit light to the dividing unit 6 through the reflection unit 11. Thus, it is possible to increase flexibility in designing and to reduce a space with respect to the optical sensor 1.

(9) The first retroreflector 4a and the second retroreflector 4b are attached to a measurement object and rotate in synchronization with a rotation of the measurement object. Thus, as an optical angle sensor, the optical sensor 1 can measure a variation amount in an angle due to the rotation of the measurement object.

(10) Thus, compared to a case where one of the first retroreflector 4a and the second retroreflector 4b is fixed and the other is attached to the measurement object, the optical sensor 1 that is an optical angle sensor can highly accurately detect, from a highly sensitive signal, a variation amount in an angle due to the rotation of the measurement object.

(11) Thus, the optical sensor 1 can highly accurately detect a variation amount in a position of the measurement object while avoiding restriction by coherency of the light source.

(12) Since the optical sensor 1 can detect a variation amount in a position of the measurement object, for example, from interfering light generated with a semiconductor laser, which is cheaper than an He—Ne laser, as the light source 2 without using an expensive He—Ne laser. Thus, a cost can be reduced.

(13) Since the dividing unit 6 and the combining unit 7 are the beam splitter 3, a plurality of pieces of diffracted light by a transmission-type diffraction grating is not generated and noise diffracted light is not generated. Also, a loss is less likely to be generated in light divided or combined by the beam splitter compared to the transmission-type diffraction grating. Moreover, it is possible to divide and combine light from the light source 2 by one beam splitter 3. Thus, compared to a case where a transmission-type diffraction grating is used as a dividing unit 6 and a combining unit 7, the optical sensor 1 can detect a variation amount in a position of a measurement object highly accurately from a highly sensitive signal using light with little loss. Also, with respect to the optical sensor 1, it is possible to reduce the number of components and to reduce a cost.

Second Embodiment

In the following, the second embodiment will be described on the basis of FIG. 5. Note that the same sign is assigned to an already-described part and a description thereof is omitted in the following description.

Figure 5:
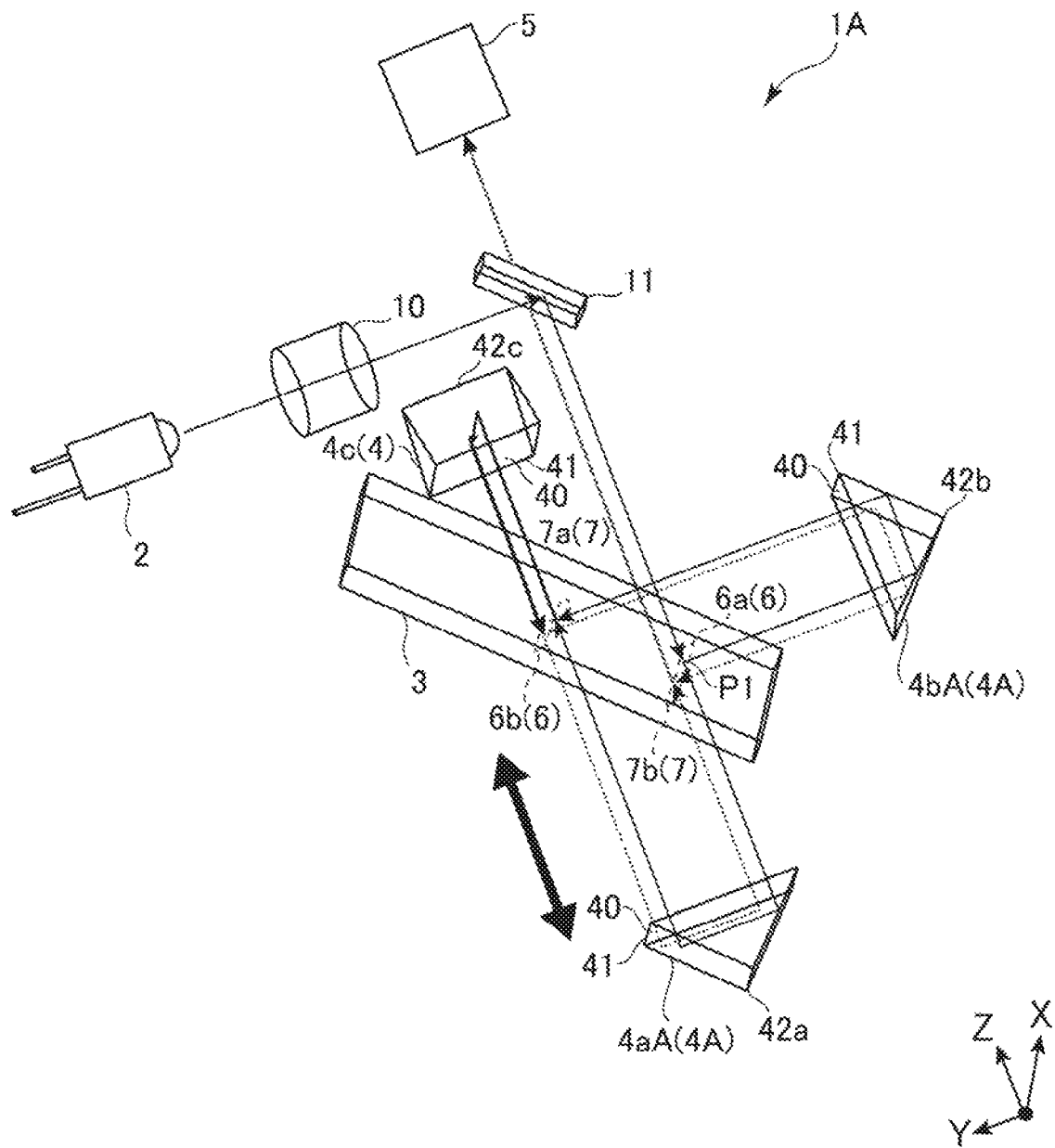
FIG. 5 is a schematic view illustrating an optical sensor according to a second embodiment.

FIG. 5 is a schematic view illustrating an optical sensor 1A according to the second embodiment.

In the first embodiment, the optical sensor 1 is an optical angle sensor in which the first retroreflector 4a and the second retroreflector 4b are attached to a measurement object and rotate in synchronization with a rotation of the measurement object.

As illustrated in FIG. 5, in the optical sensor 1A of the second embodiment, a first retroreflector 4aA is attached to a measurement object, a second retroreflector 4bA is fixedly provided in the optical sensor 1A, and the first retroreflector 4aA is advanced/retracted in synchronization in an incident direction of light from a light source 2 along with movement of the measurement object. The second embodiment is different from the first embodiment in a point that such a structure is included.

In such a second embodiment, it is also possible to acquire actions and effects similar to those in (1) to (8) and (11) to (13) in the first embodiment. In addition, the following action and effect can be acquired.

(14) As an optical length-measuring sensor, the optical sensor 1A can measure a variation amount in a position due to movement of a measurement object.

Third Embodiment

In the following, the third embodiment will be described on the basis of FIG. 6 and FIG. 7. Note that the same sign is assigned to an already-described part and a description thereof is omitted in the following description.

Figure 6:
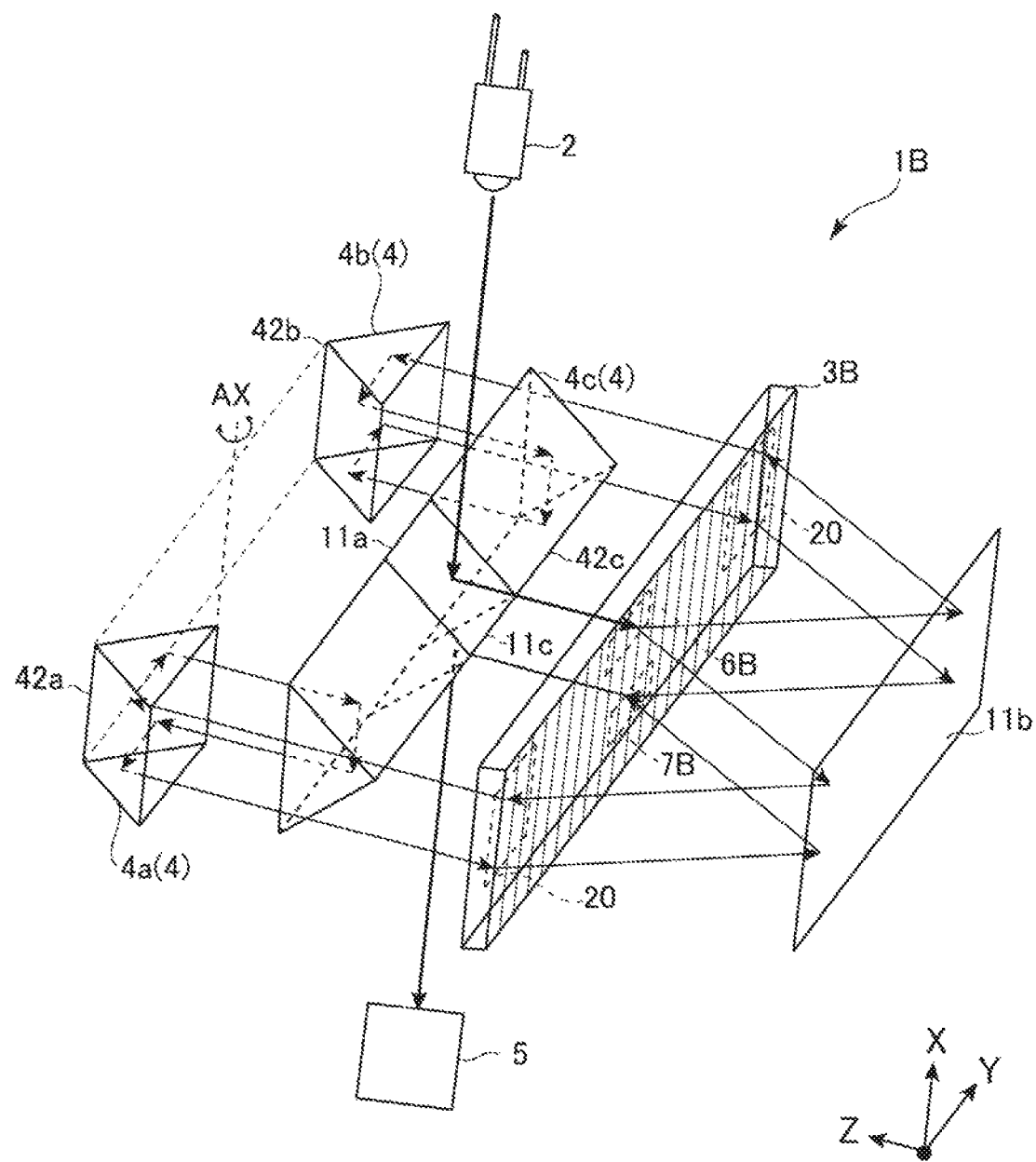
FIG. 6 is a schematic view illustrating an optical sensor according to a third embodiment.
Figure 7:
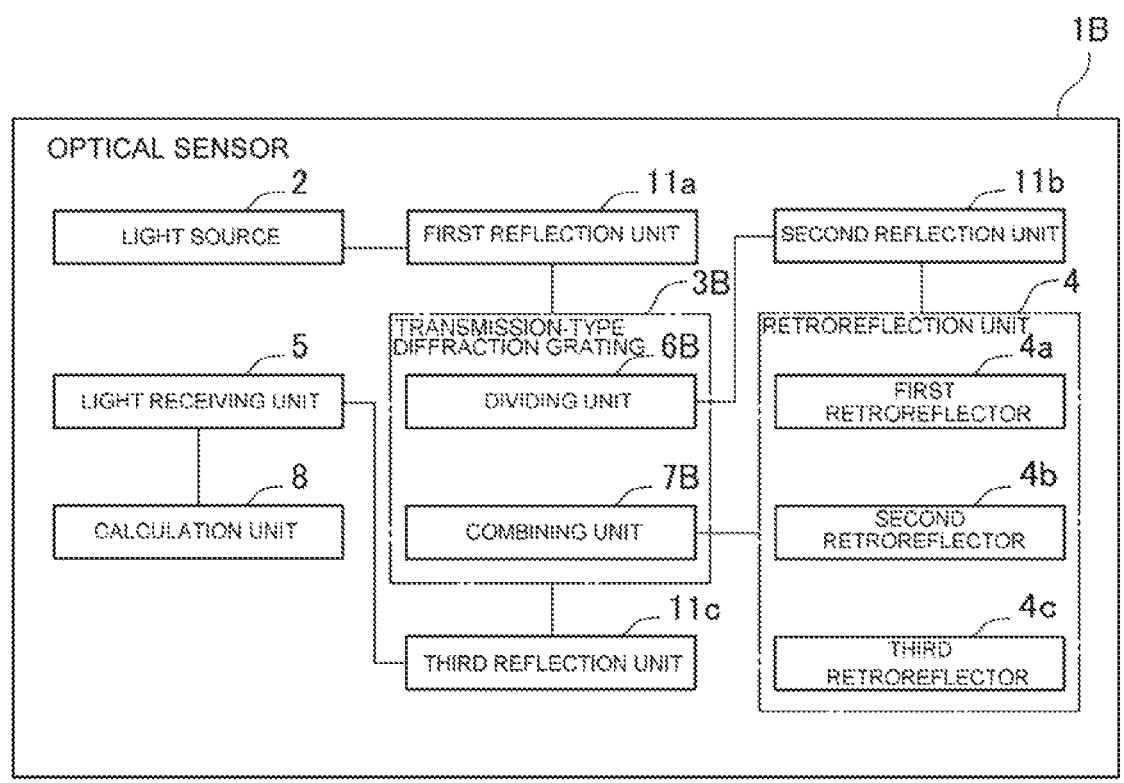
FIG. 7 is a block diagram illustrating the optical sensor.

FIG. 6 is a schematic view illustrating an optical sensor 1B according to the third embodiment, and FIG. 7 is a block diagram illustrating the optical sensor 1B.

In the first embodiment, the dividing unit 6 and the combining unit 7 are the beam splitter 3 and are provided in one beam splitter in the optical sensor 1.

As illustrated in FIG. 6 and FIG. 7, in the optical sensor 1B of the third embodiment, a dividing unit 6B and a combining unit 7B are a transmission-type diffraction grating 3B including a plurality of gratings 60 and 70 to diffract light from a light source 2 and are provided in one transmission-type diffraction grating 3B. Also, the optical sensor 1B further includes a first reflection unit 11a, a second reflection unit 1ib, and a third reflection unit 11c. The third embodiment is different from the first embodiment in these points.

Each of the first reflection unit 11a, the second reflection unit 1ib, and the third reflection unit 11c is a mirror that can reflect light. Note that each of the first reflection unit 11a, the second reflection unit 11b, and the third reflection unit 11c does not need to be a mirror. As long as light can be reflected, anything such as a half mirror or a beam splitter can be employed.

The first reflection unit 11a reflects light from the light source 2 toward the transmission-type diffraction grating 3B in such a manner as to change a direction thereof. The second reflection unit 11b is arranged on an opposite side of a retroreflection unit 4 with the transmission-type diffraction grating 3B being arranged therebetween. More specifically, the second reflection unit 11b reflects first light and second light divided by the dividing unit 6B, and first light and second light that advance toward the combining unit 7B through the retroreflection unit 4. The third reflection unit 11c reflects combined light, which is emitted from the combining unit 7B, in such a manner as to change a direction thereof toward a light receiving unit 5. The first reflection unit 11a and the third reflection unit 11c are provided on an opposite side of a reflection surface 40 of a reflector 41 in a third retroreflector 4c.

The transmission-type diffraction grating 3B is formed of a translucent glass, and includes a plurality of gratings 60 and 70 arranged in a predetermined pitch. The plurality of gratings 60 and 70 are provided in such a manner as to face the first reflection unit 11a in the transmission-type diffraction grating 3B. Note that the transmission-type diffraction grating 3B is not necessarily formed of glass and may be formed of an arbitrary translucent member.

Light from the light source 2 through the plurality of gratings 60 and 70 of the transmission-type diffraction grating 3B becomes a plurality of pieces of diffracted light.

Here, the plurality of pieces of diffracted light includes diffracted light that advances in a direction that is the same as an optical axis of light emitted from the light source 2, diffracted light that advances in a predetermined diffraction angle on both sides of the optical axis, and diffracted light that advances in a diffraction angle larger than the predetermined diffraction angle on the both sides of the optical axis.

When diffracted light that advances in the same direction as the optical axis is zero-order diffracted light, the plurality of pieces of diffracted light can be ordered as ±first-order diffracted light and ±second-order diffracted light in a direction in which a diffraction angle becomes large with the zero-order diffracted light as a reference.

The light receiving unit 5 detects a signal from interfering light generated mainly by the ±first-order diffracted light.

The transmission-type diffraction grating 3B includes the dividing unit 6B that divides light from the light source 2 into first light and second light, and the combining unit 7B that combines the light divided by the dividing unit 6B and retroreflected by the reflection unit 4 into combined light. The dividing unit 6B and the combining unit 7B are provided in the one transmission-type diffraction grating 3B. Also, the transmission-type diffraction grating 3B includes a diffraction grating unit 20 that diffracts directions of first light or second light reflected by the second reflection unit 11b, and first light or second light from the first retroreflector 4a and the second retroreflector 4b toward the second reflection unit 11b.

The dividing unit 6 has a dividing surface 61 to which light from the light source 2 is emitted. The dividing unit 6 includes the plurality of gratings 60 juxtaposed in a Y axis direction that is a direction orthogonal to an X axis on the dividing surface 61. Similarly, the combining unit 7 includes the plurality of gratings 70 juxtaposed in the Y axis direction on the dividing surface 61.

Here, an optical path of light in the optical sensor 1B will be described on the basis of FIG. 6.

First, in the optical sensor 1B, light emitted from the light source 2 is reflected by the first reflection unit 11a in such a manner that a direction thereof is changed toward the transmission-type diffraction grating 3B. Next, the light reflected by the first reflection unit 11a is divided into first light and second light by the dividing unit 6B. The divided first light and second light are reflected by the second reflection unit 11b toward the diffraction grating unit 20. Subsequently, the first retroreflector 4a performs first retroreflection of the first light toward the third retroreflector 4c, and the second retroreflector 4b performs first retroreflection of the second light toward the third retroreflector 4c.

The third retroreflector 4c retroreflects the first light, which is offset in the X axis direction, to the first retroreflector 4a and retroreflects the second light, which is offset in the X axis direction, to the second retroreflector 4b. Then, the first retroreflector 4a performs second retroreflection of the first light in an offset position toward the diffraction grating unit 20, and the second retroreflector 4b performs second retroreflection of the second light in an offset position toward the diffraction grating unit 20. The diffraction grating unit 20 diffracts the first light and the second light toward the second reflection unit 11b, and the second reflection unit 11b reflects the first light and the second light toward the combining unit 7B. The first light and the second light reflected toward the combining unit 7B become combined light, and are emitted to the light receiving unit 5 through the third reflection unit 11c.

In the third embodiment, the first light and the second light are retroreflected twice by the first retroreflector 4a and the second retroreflector 4b through the third retroreflector 4c. Accordingly, even in a case where the first retroreflector 4a and the second retroreflector 4b are arranged with an inclination, it is possible to cancel an inclination that is generated due to the inclination thereof and that is in a traveling direction of the first light and the second light.

Thus, since the third retroreflector 4c is included, the optical sensor 1B can measure a position or an angle without generating interference fringes due to a variation in a traveling direction of a reflected light beam.

In such a third embodiment, it is also possible to acquire actions and effects similar to those in (1) to (12) in the first embodiment. In addition, the following action and effect can be acquired.

(15) Since being the transmission-type diffraction grating 3B, the dividing unit 6B and the combining unit 7B can easily divide or combine light from the light source 2. Also, since the dividing unit 6B and the combining unit 7B are provided in one transmission-type diffraction grating 3B, light can be divided and combined by only one transmission-type diffraction grating 3B. Thus, compared to a case where a plurality of optical components is used, it is possible to reduce a cost of the optical sensor 1B since it is not necessary to use a complicated optical component and processing or assembling can be omitted.

Fourth Embodiment

In the following, the fourth embodiment will be described on the basis of FIG. 8. Note that the same sign is assigned to an already-described part and a description thereof is omitted in the following description.

Figure 8:
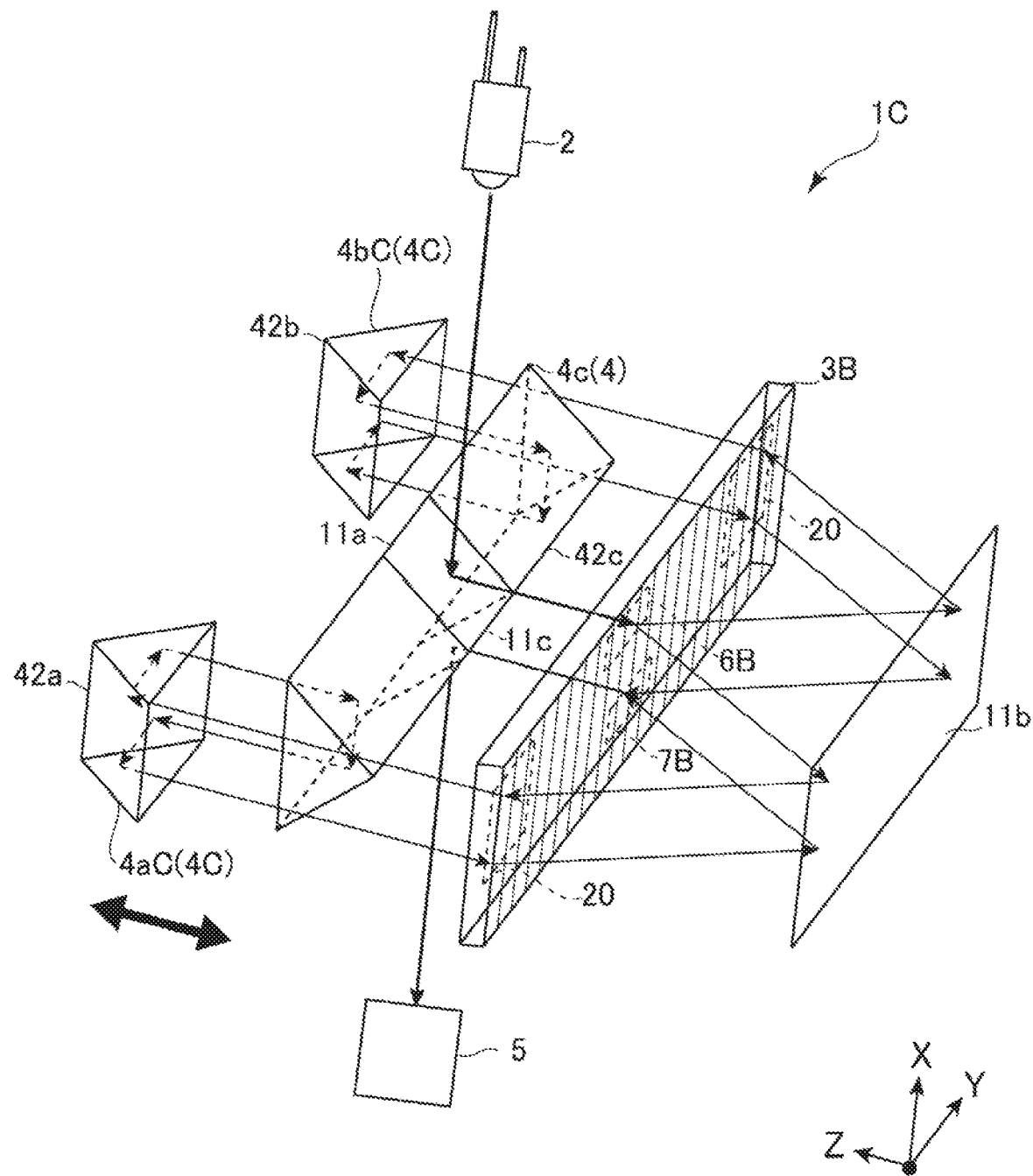
FIG. 8 is a schematic view illustrating an optical sensor according to a fourth embodiment.

FIG. 8 is a schematic view illustrating an optical sensor 1C according to the fourth embodiment.

In the third embodiment, the optical sensor 1B is an optical angle sensor in which the first retroreflector 4a and the second retroreflector 4b are attached to a measurement object and rotate in synchronization with a rotation of the measurement object.

As illustrated in FIG. 8, in the optical sensor 1C of the fourth embodiment, a first retroreflector 4aC is attached to a measurement object, a second retroreflector 4bC is fixedly provided in the optical sensor 1C, and the first retroreflector 4aC is advanced/retracted in synchronization in an incident direction of light from a light source 2 along with movement of the measurement object. The fourth embodiment is different from the third embodiment in a point that such a structure is included.

In such a fourth embodiment, it is also possible to acquire actions and effects similar to those in the second embodiment. In addition, the following action and effect can be acquired.

(16) Even when a dividing unit 6B and a combining unit 7B are a transmission-type diffraction grating 3B, an optical sensor 1C can measure, as an optical length-measuring sensor, a variation amount in a position due to movement of a measurement object.

Fifth Embodiment

In the following, the fifth embodiment of the present invention will be described on the basis of FIG. 9. Note that the same sign is assigned to an already-described part and a description thereof is omitted in the following description.

Figure 9:
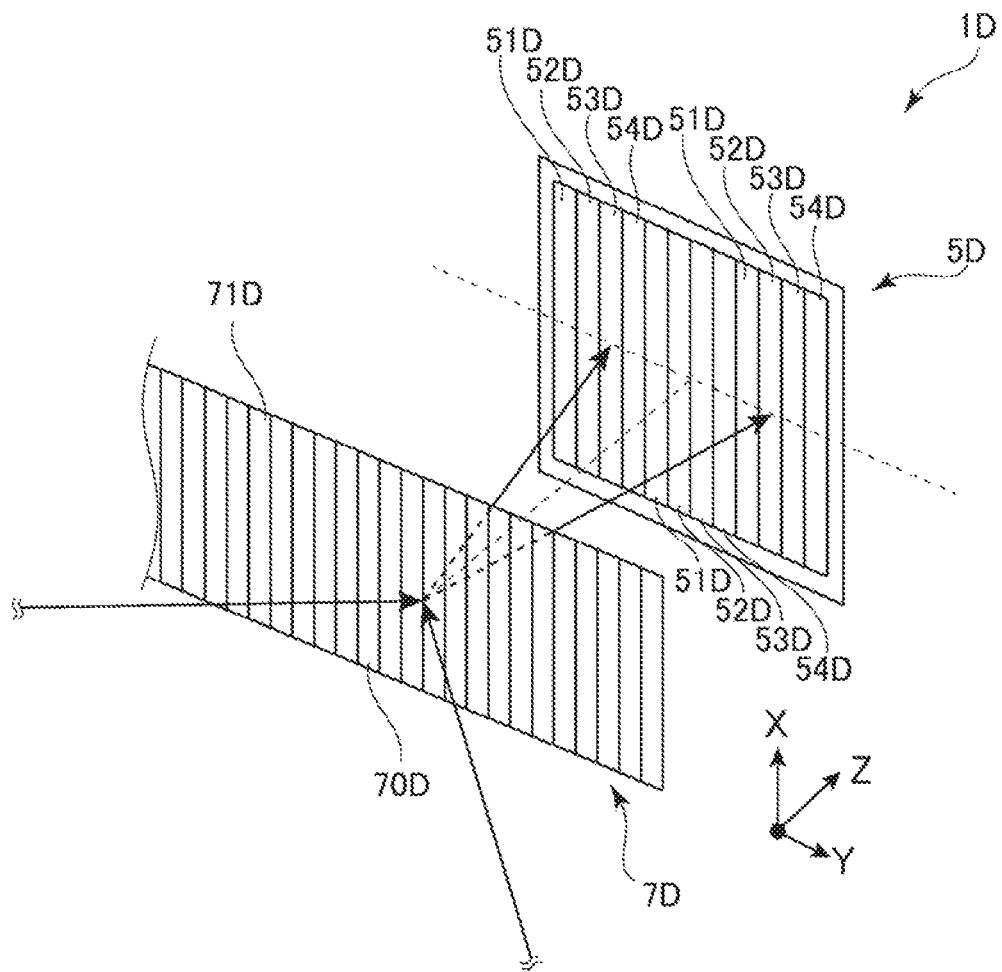
FIG. 9 is a schematic view illustrating a combining unit and a light receiving unit in an optical sensor according to a fifth embodiment.

FIG. 9 is a schematic view illustrating a combining unit 7D and a light receiving unit 5D in an optical sensor 1D according to the fifth embodiment.

In the third embodiment, the optical sensor 1B is an optical angle sensor, and the calculation unit 8 (see FIG. 7) detects a variation amount in an angle due to a rotation of a measurement object on the basis of interfering light received by the light receiving unit 5. Also, in the fourth embodiment, the optical sensor 1C is an optical length-measuring sensor, and the calculation unit 8 detects a variation amount in a position due to movement of a measurement object on the basis of interfering light received by the light receiving unit 5.

As illustrated in FIG. 9, in the fifth embodiment, the combining unit 7D in the optical sensor 1D includes a combining surface 71D that combines first light and second light, and a plurality of gratings 70D juxtaposed in a Y axis direction that is a predetermined direction on the combining surface 71D. Then, the light receiving unit 5D includes a plurality of light receiving elements 51D to 54D juxtaposed in the Y axis direction that is the predetermined direction, and receives a plurality of pieces of diffracted light through the plurality of gratings 70D. The calculation unit 8 calculates a variation amount in a position of a measurement object on the basis of the plurality of pieces of diffracted light received by the plurality of light receiving elements 51D to 54D. The fifth embodiment is different from the first embodiment to fourth embodiment in these points. The predetermined direction is also a direction orthogonal to a direction substantially in parallel with a first direction and a second direction on the combining surface 71D.

Note that for convenience of description, the light source 2, the first retroreflector 4a, the second retroreflector 4b, the dividing unit 6 on the transmission-type diffraction grating 3B, the first reflection unit 11a, the second reflection unit 11b, and the third reflection unit 11c in FIG. 6 and FIG. 8 are omitted in FIG. 9.

A traveling direction of the first light transmitted through the plurality of gratings 70D is diffracted to a side of a −Y axis direction, and a traveling direction of second light transmitted through the plurality of gratings 70D is diffracted to a side of a +Y axis direction. Here, for example, in a case where the first light is + first-order diffracted light and the second light is − first-order diffracted light, light of a different diffraction order (such as ±second-order diffracted light) is diffracted in a separated direction different from those of the first light and the second light and is not emitted to the light receiving unit 5D. Then, the first light (+first-order diffracted light) and the second light (−first-order diffracted light) generate interference fringes, on a light receiving surface of the light receiving unit 5D (plurality of light receiving element 51D to 54D), in an X axis direction that is a direction orthogonal to the predetermined direction and substantially in parallel with the first direction and the second direction.

In order to specify a moving direction of the measurement object, the optical sensor 1D preferably uses a four-phase signal (plurality of sine-wave signal) having a phase difference. Thus, the plurality of light receiving elements 51D to 54D are designed to acquire a four-phase signal in synchronization with a period of interference fringes.

For example, in a case where a plurality of gratings 60 of a dividing unit 6B (see FIG. 6) is designed to have a period of 1 µm, the plurality of gratings 70D of the combining unit 7D is designed to have a period of 1.005 µm in a manner of being slightly deviated from the period of the plurality of gratings 60 of the dividing unit 6. Then, the plurality of light receiving elements 51D to 54D is designed to have a period of 1.005 μm in such a manner as to have the same period as the plurality of gratings 70D of the combining unit 7D.

More specifically, the plurality of light receiving elements 51D to 54D includes a first light receiving element 51D, a second light receiving element 52D, a third light receiving element 53D, and a fourth light receiving element 54D.

The first light receiving element 51D receives light having a phase of 0 degrees from interference fringes generated on the light receiving surface through the plurality of gratings 70D. The second light receiving element 52D receives light having a phase of 90 degrees from the interference fringes generated on the light receiving surface through the plurality of gratings 70D. The third light receiving element 53D receives light having a phase of 180 degrees from the interference fringes generated on the light receiving surface through the plurality of gratings 70D. The fourth light receiving element 54D receives light having a phase of 270 degrees from the interference fringes generated on the light receiving surface through the plurality of gratings 70D.

Then, the plurality of light receiving elements 51D to 54D is repeatedly arranged, in the Y axis direction that is the predetermined direction, in order of the first light receiving element 51D, the second light receiving element 52D, the third light receiving element 53D, and the fourth light receiving element 54D. The optical sensor 1D detects a four-phase signal from a signal received by this plurality of light receiving elements 51D to 54D, and the calculation unit 8 can calculate a moving direction of the measurement object and a variation amount in a position due to movement of the measurement object. Note that the optical sensor 1D may be an optical angle sensor or an optical length-measuring sensor.

In such a fifth embodiment, it is also possible to acquire actions and effects similar to those in the third embodiment and the fourth embodiment. In addition, the following action and effect can be acquired.

(17) The combining unit 7D includes the plurality of gratings 70D, and the light receiving unit 5D includes the plurality of light receiving elements 51D to 54D and receives a plurality of pieces of diffracted light through the plurality of gratings 70D. The plurality of pieces of diffracted light generates interference fringes, on the light receiving surface of the light receiving unit 5D, in the X axis direction that is an orthogonal direction orthogonal to the predetermined direction on the combining surface 71D. The plurality of light receiving elements 51D to 54D can detect a four-phase signal from the interference fringes. The calculation unit 8 can calculate, from this four-phase signal, a moving direction of the measurement object and a variation amount in a position due to movement. Thus, the optical sensor 1D can detect a variation amount in a position of the measurement object highly accurately from the interference fringes compared to a case where a variation amount in a position of a measurement object is calculated from interfering light.

Sixth Embodiment

In the following, the sixth embodiment of the present invention will be described on the basis of FIG. 10. Note that the same sign is assigned to an already-described part and a description thereof is omitted in the following description.

Figure 10:
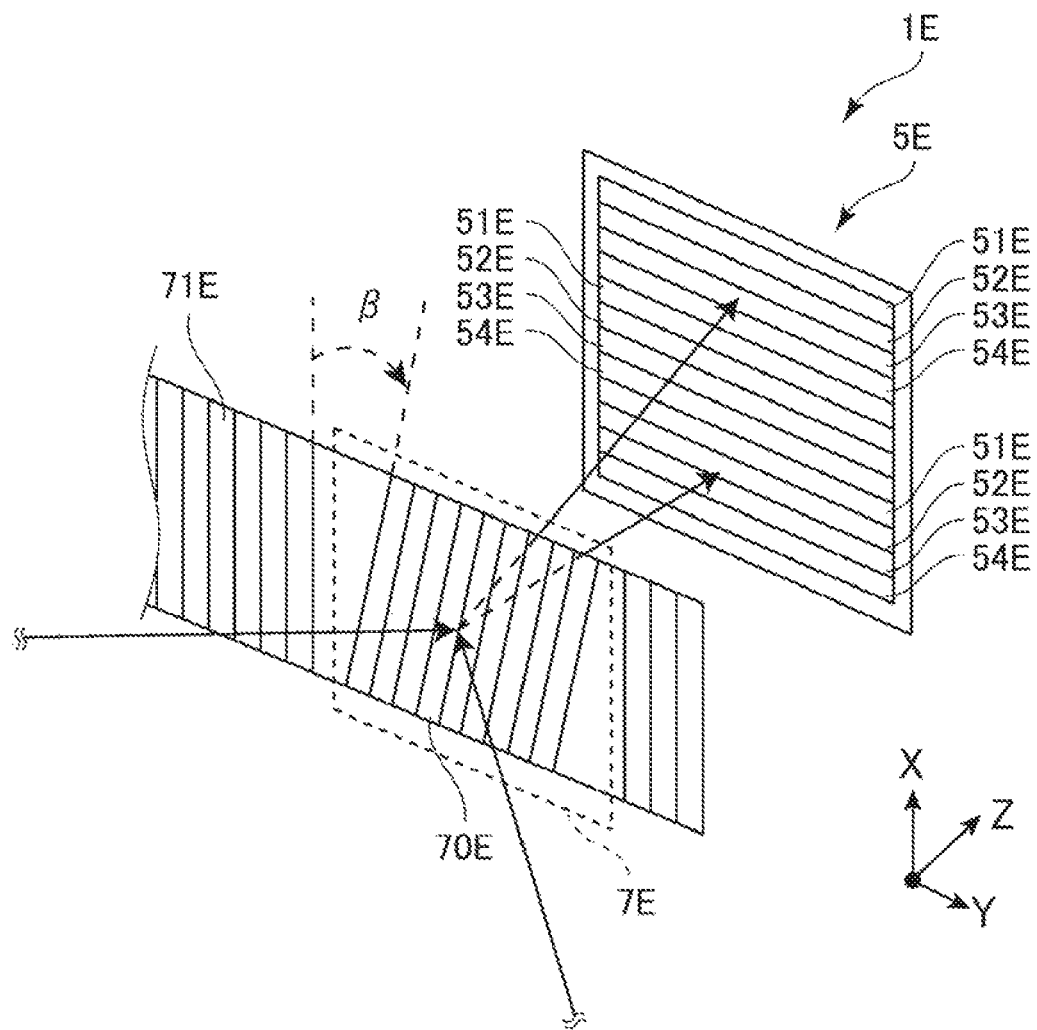
FIG. 10 is a schematic view illustrating a combining unit and a light receiving unit in an optical sensor according to a sixth embodiment.

FIG. 10 is a schematic view illustrating a combining unit 7E and a light receiving unit 5E in an optical sensor 1E according to the sixth embodiment.

In the fifth embodiment, the calculation unit 8 (see FIG. 7) detects a variation amount in a position due to movement of a measurement object on the basis of interfering light received by the light receiving unit 5D. Then, the combining unit 7D includes the plurality of gratings 70D juxtaposed in the Y axis direction that is the predetermined direction on the combining surface 71E.

As illustrated in FIG. 10, in the sixth embodiment, the combining unit 7E in the optical sensor 1E includes a combining surface 71E that combines first light and second light. Then, the combining unit 7E includes a plurality of inclined gratings 70E juxtaposed in a Y axis direction, which is a predetermined direction, on the combining surface 71E and arranged at a predetermined inclination angle R with respect to an optical axis of light from the light source 2. The light receiving unit 5E includes a plurality of light receiving elements 51E to 54E juxtaposed in an X axis direction that is an orthogonal direction orthogonal to the Y axis direction that is the predetermined direction on the combining surface 71E, and receives a plurality of pieces of diffracted light through the plurality of inclined gratings 70E. The calculation unit 8 calculates a variation amount in a position of a measurement object on the basis of the plurality of pieces of diffracted light received by the light receiving unit 5E. The sixth embodiment is different from the fifth embodiment in these points. In the sixth embodiment, the predetermined direction is also a direction orthogonal to a direction substantially in parallel with a first direction and a second direction, and the orthogonal direction orthogonal to the predetermined direction is a direction substantially in parallel with the first direction and the second direction on the combining surface 71E.

Note that for convenience of description, the light source 2, the first retroreflector 4a, the second retroreflector 4b, the dividing unit 6 on the transmission-type diffraction grating 3B, the first reflection unit 11a, the second reflection unit 11b, and the third reflection unit 11c in FIG. 6 and FIG. 8 are omitted in FIG. 10.

A traveling direction of first light transmitted through the plurality of inclined gratings 70E is diffracted to a side of a +X axis direction, and a traveling direction of second light transmitted through the plurality of inclined gratings 70E is diffracted to a side of a −X axis direction. Here, for example, in a case where the first light is + first-order diffracted light and the second light is − first-order diffracted light, light of a different diffraction order (such as ±second-order diffracted light) is diffracted in a separated direction different from those of the first light and the second light and is not emitted to the light receiving unit 5E. Then, the first light (+first-order diffracted light) and the second light (−first-order diffracted light) generate, on a light receiving surface of the light receiving unit 5E (plurality of light receiving element 51E to 54E), interference fringes in the Y axis direction that is the predetermined direction on the combining surface 71E.

In order to specify a moving direction of a measurement object, the optical sensor 1E preferably uses a four-phase signal (plurality of sine-wave signal) having a phase difference. Thus, the plurality of light receiving elements 51E to 54E is designed to acquire a four-phase signal in synchronization with a period of the interference fringes generated on the light receiving surface of the plurality of light receiving elements 51E to 54E.

More specifically, the plurality of light receiving elements 51E to 54E includes a first light receiving element 51E, a second light receiving element 52E, a third light receiving element 53E, and a fourth light receiving element 54E. The first light receiving element 51E receives light having a phase of 0 degrees from the interference fringes generated on the light receiving surface through the plurality of inclined gratings 70E. The second light receiving element 52E receives light having a phase of 90 degrees from the interference fringes generated on the light receiving surface through the plurality of inclined gratings 70E. The third light receiving element 53E receives light having a phase of 180 degrees from the interference fringes generated on the light receiving surface through the plurality of inclined gratings 70E. The fourth light receiving element 54E receives light having a phase of 270 degrees from the interference fringes generated on the light receiving surface through the plurality of inclined gratings 70E. Then, the plurality of light receiving elements 51E to 54E are repeatedly arranged, in a direction in parallel with the X axis, in order of the first light receiving element 51E, the second light receiving element 52E, the third light receiving element 53E, and the fourth light receiving element 54E. The optical sensor 1E detects a four-phase signal from a signal received by this plurality of light receiving elements 51E to 54E, and the calculation unit 8 can calculate a moving direction of the measurement object and a variation amount in a position due to movement of the measurement object. Note that the optical sensor 1E may be an optical angle sensor or an optical length-measuring sensor.

In such a sixth embodiment, it is also possible to acquire actions and effects similar to those in the third embodiment and the fourth embodiment. In addition, the following action and effect can be acquired.

(18) The combining unit 7E includes the plurality of inclined gratings 70E, and the light receiving unit 5E receives a plurality of pieces of diffracted light through the plurality of inclined gratings 70E. The plurality of pieces of diffracted light generates, on the light receiving surface of the light receiving unit 5E, interference fringes in the Y axis direction that is the predetermined direction on the combining surface 71E. Thus, the plurality of light receiving elements of the light receiving unit 5E can detect a four-phase signal from the interference fringes. The calculation unit 8 can calculate, from this four-phase signal, a moving direction of the measurement object and a variation amount in a position due to movement. Thus, the optical sensor 1E can highly accurately detect, from the interference fringes, a variation amount in a position due to movement of the measurement object compared to a case where a variation amount in a position due to movement of a measurement object is calculated from interfering light.

Seventh Embodiment

In the following, the seventh embodiment of the present invention will be described on the basis of FIG. 11A and FIG. 11B. Note that the same sign is assigned to an already-described part and a description thereof is omitted in the following description.

Figure 11A:
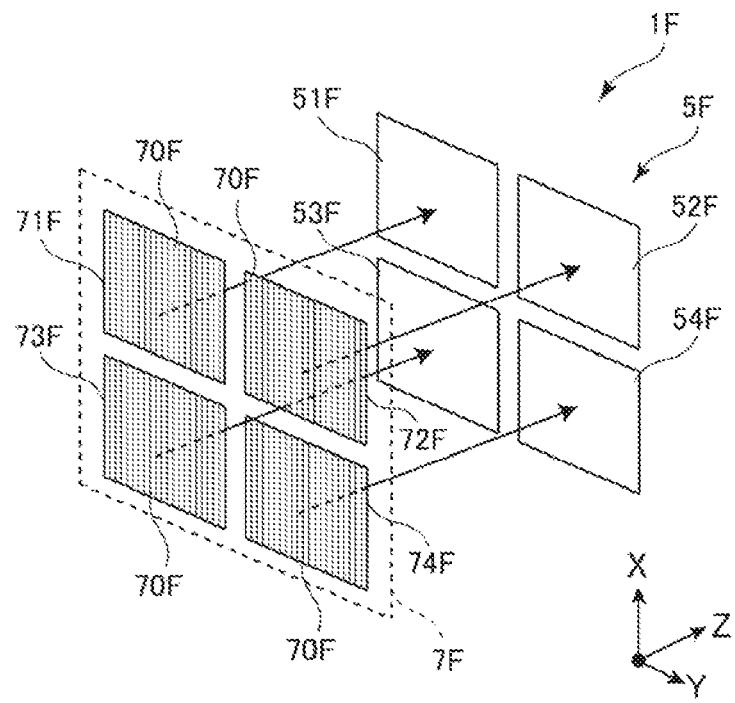
FIG. 11A and FIG. 11B are schematic views illustrating a combining unit and a light receiving unit in an optical sensor according to a seventh embodiment.
Figure 11B:
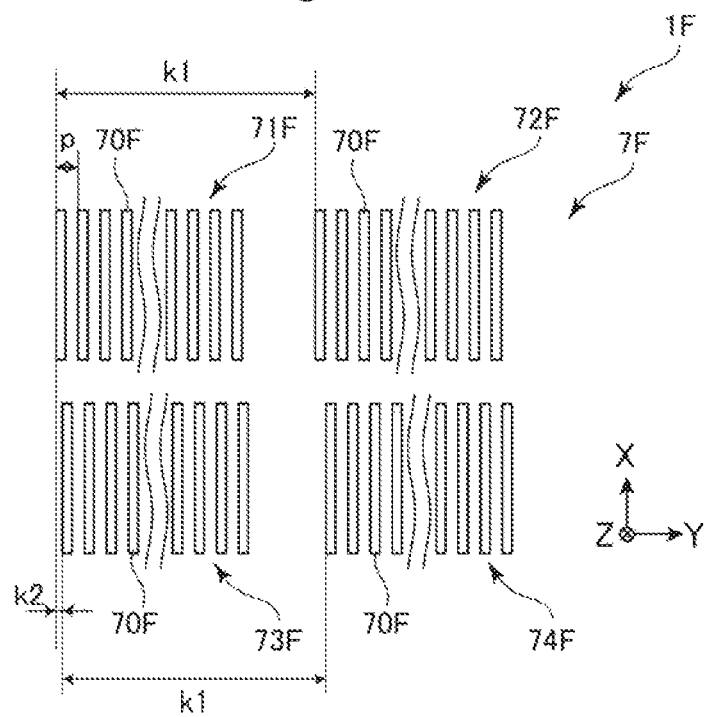

FIG. 11A and FIG. 11B are schematic views illustrating a combining unit 7F and a light receiving unit 5F in an optical sensor 1F according to the seventh embodiment. More specifically, FIG. 11A is a schematic view illustrating an arrangement of the combining unit 7F and the light receiving unit 5F in the optical sensor 1F. FIG. 11B is a view illustrating a detailed phase difference in a plurality of gratings 70F included in a plurality of combining units 71F to 74F of the combining unit 7F.

In the fifth embodiment, the calculation unit 8 (see FIG. 7) detects a variation amount in an angle due to a rotation of a measurement object on the basis of interfering light received by the light receiving unit 5D. Also, the combining unit 7D includes the plurality of gratings 70D juxtaposed in the Y axis direction that is the predetermined direction on the combining surface 71D.

As illustrated in FIG. 11A, in the seventh embodiment, the combining unit 7F in the optical sensor 1F includes the plurality of combining units 71F to 74F respectively having different phases. The light receiving unit 5F includes a plurality of light receiving units 51F to 54F respectively corresponding to the plurality of combining units 71F to 74F. Then, from a plurality of signals that respectively has different phases and that is based on light received by the plurality of light receiving units 51F to 54F, a calculation unit 8 (see FIG. 7) calculates a direction of a rotation of a measurement object and a variation amount in an angle due to the rotation of the measurement object. The seventh embodiment is different from the fifth embodiment in these points.

Note that for convenience of description, the light source 2, the first retroreflector 4a, the second retroreflector 4b, the dividing unit 6 on the transmission-type diffraction grating 3B, the first reflection unit 11a, the second reflection unit 11b, and the third reflection unit 11c in FIG. 6 and FIG. 8 are omitted in FIG. 11A.

The combining unit 7F includes, as the plurality of combining units 71F to 74F, a first combining unit 71F, a second combining unit 72F, a third combining unit 73F, and a fourth combining unit 74F.

The first combining unit 71F includes a plurality of gratings 70F in which a phase is arranged at 0 degrees. The second combining unit 72F includes a plurality of gratings 70F in which a phase is arranged at 90 degrees. The third combining unit 73F includes a plurality of gratings 70F in which a phase is arranged at 180 degrees. The fourth combining unit 74F includes a plurality of gratings 70F in which a phase is arranged at 270 degrees.

The light receiving unit 5F includes, as the plurality of light receiving units 51F to 54F, a first light receiving unit 51F, a second light receiving unit 52F, a third light receiving unit 53F, and a fourth light receiving unit 54F.

The first light receiving unit 51F receives light having a phase of 0 degrees through the first combining unit 71F. The second light receiving unit 52F receives light having a phase of 90 degrees through the second combining unit 72F. The third light receiving unit 53F receives light having a phase of 180 degrees through the third combining unit 73F. The fourth light receiving unit 54F receives light having a phase of 270 degrees through the fourth combining unit 74F.

First light and second light through a first retroreflector 4a and a second retroreflector 4b are emitted in an overlapped manner to the entire plurality of combining units 71F to 74F. The light emitted to the entire plurality of combining units 71F to 74F is simultaneously emitted, as interfering light of each phase, to the plurality of light receiving units 51F to 54F respectively. From the emitted interfering light, the plurality of light receiving units 51F to 54F detects a four-phase signal as a signal having a phase corresponding to each thereof. The calculation unit 8 can calculate, from the four-phase signal, a moving direction of the measurement object and a variation amount in a position due to movement. Thus, compared to a case where a plurality of combining units 71F to 74F and a plurality of light receiving units 51F to 54F are not included, the optical sensor 1F can highly accurately detect a variation amount in a position due to movement of the measurement object.

As illustrated in FIG. 11B, in a case where a period of the plurality of gratings 70F is p, an integer is n, and an offset is k, the plurality of combining units 71F to 74F, which is juxtaposed in a Y axis direction, of the combining unit 7F is arranged in a relationship in a manner of an expression (1).

$$k1 = n \times p + p \div 8 \quad (1)$$

More specifically, the second combining unit 72F is arranged in such a manner as to be offset, with respect to the first combining unit 71F, for a value of k1 acquired from the expression (1). The third combining unit 73F is arranged in such a manner as to be offset in the Y axis direction, with respect to the first combining unit 71F, for a value of k2 acquired from p÷4. The fourth combining unit 74F is arranged in such a manner as to be offset, with respect to the third combining unit 73F, for a value of k1 acquired from the expression (1). Thus, the plurality of light receiving units 51F to 54F can respectively receive pieces of interfering light having different phases from the plurality of combining units 71F to 74F.

Note that the optical sensor 1F may be an optical angle sensor or an optical length-measuring sensor.

Even in such a seventh embodiment, it is possible to acquire actions and effects similar to those in the third embodiment and the fourth embodiment. In addition, the following action and effect can be acquired.

(19) The optical sensor 1F can generate a plurality of pieces of combined light with the plurality of combining units 71F to 74F, and detect a four-phase signal. Thus, the optical sensor 1F can highly accurately detect a variation amount in a position due to movement of a measurement object by using the four-phase signal.

Eighth Embodiment

In the following, the eighth embodiment of the present invention will be described on the basis of FIG. 12. Note that the same sign is assigned to an already-described part and a description thereof is omitted in the following description.

Figure 12:
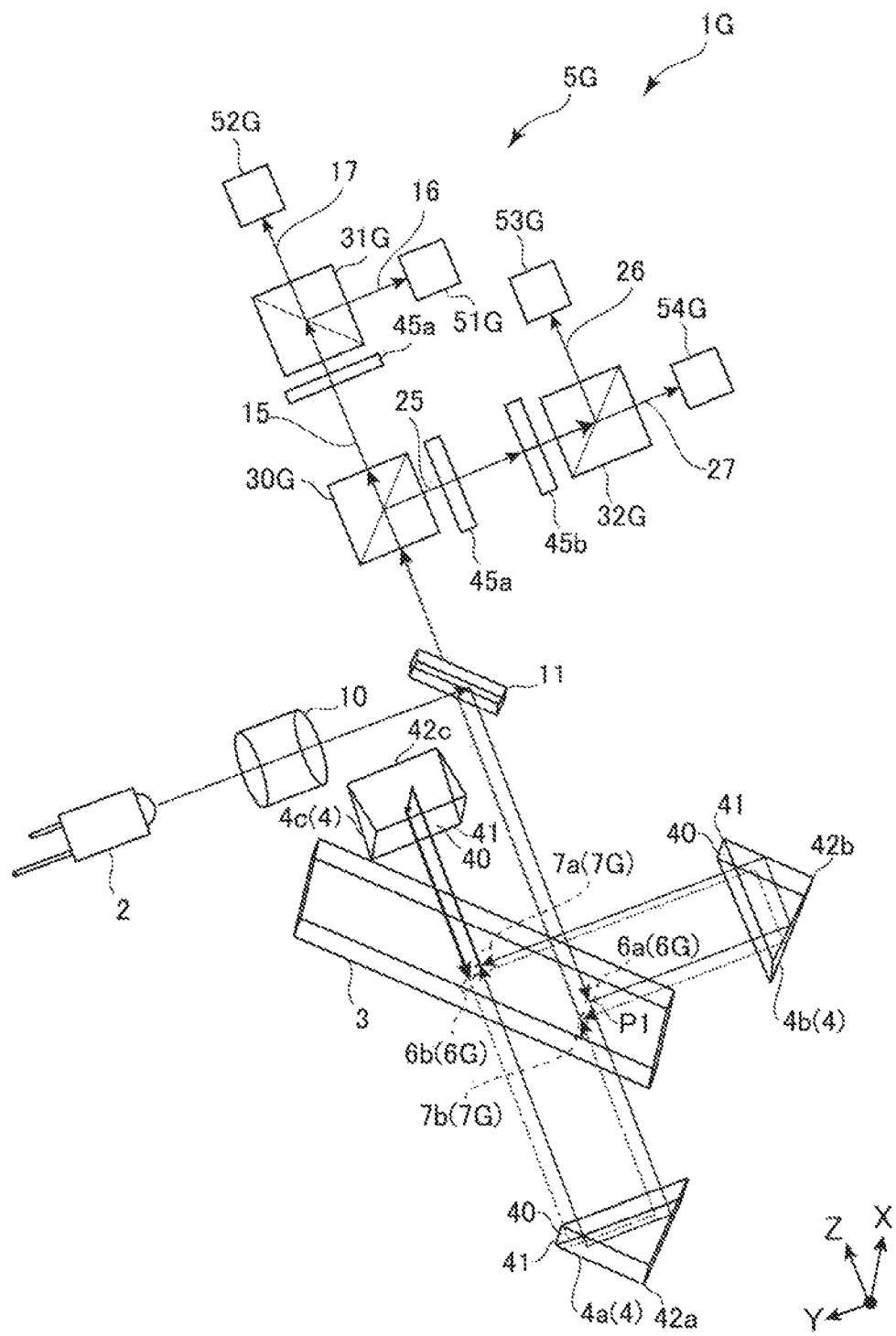
FIG. 12 is a schematic view illustrating an optical sensor according to an eighth embodiment.

FIG. 12 is a schematic view illustrating an optical sensor 1G according to the eighth embodiment.

In the first embodiment, the dividing unit 6 and the combining unit 7 are provided in the beam splitter 3, and the light receiving unit 5 receives combined light through the combining unit 7.

In the eighth embodiment, a dividing unit 6G in the optical sensor 1G is a polarizing beam splitter 3G. The optical sensor 1G includes a dividing beam splitter 30G that divides combined light by a combining unit 7G into first divided light 15 and second divided light 25, a first quarter-wave plate 45a that is arranged in an optical path of each of the first divided light 15 and the second divided light 25 divided by the dividing beam splitter 30G, a second quarter-wave plate 45b that is arranged in an optical path of the second divided light 25 through the first quarter-wave plate 45a, a first divided light polarizing beam splitter 31G that divides the first divided light 15 through the first quarter-wave plate 45a into first polarized light 16 and second polarized light 17, a second divided light polarizing beam splitter 32G that divides the second divided light 25 through the second quarter-wave plate 45b into third polarized light 26 and fourth polarized light 27, a first light receiving unit 51G that receives light having a phase of 0 degrees from the first polarized light 12, a second light receiving unit 52G that receives light having a phase of 180 degrees from the second polarized light 17, a third light receiving unit 53G that receives light having a phase of 90 degrees from the third polarized light 26, and a fourth light receiving unit 54G that receives light having a phase of 270 degrees from the fourth polarized light 27. The eighth embodiment is different from the first embodiment in these points.

The dividing unit 6G that is the polarizing beam splitter 3G is a plate-type optical component that separates light from the light source 2 into two polarized components that are S polarized light that is light of S random polarized light, and P polarized light that is light of P random polarized light. The polarizing beam splitter 3G reflects first light that is the S polarized light and transmits second light that is the P polarized light. In the eighth embodiment, a description will be made with the S polarized light as the first light and the P polarized light as the second light.

The dividing beam splitter 30G is a non-polarizing beam splitter. The first divided light polarizing beam splitter 31G and the second divided light polarizing beam splitter 32G are polarizing beam splitters.

Instead of dividing the combined light emitted from the combining unit 7G into the S polarized light and the P polarized light, the dividing beam splitter 30G that is a non-polarizing beam splitter divides the combined light from the combining unit 7G into the first divided light 15 and the second divided light 25 similarly to a case of dividing light that is non-polarized light on average.

The first divided light 15 becomes light a phase of which is deviated for 90 degrees from that of the first divided light 15 through the first quarter-wave plate 45a, and is emitted to the first divided light polarizing beam splitter 31G. The first divided light 15 emitted to the first divided light polarizing beam splitter 31G is polarized and divided into the first polarized light 16 that is the S polarized light, and the second polarized light 17 that is the P polarized light. Then, the first light receiving unit 51G receives the first polarized light 16 and receives interfering light that is light having a phase of 0 degrees. Also, the second light receiving unit 52G receives the second polarized light 17 and receives interfering light that is light having a phase of 180 degrees.

The second divided light 25 becomes light a phase of which is deviated for 180 degrees from that of the second divided light 25 through the first quarter-wave plate 45a and the second quarter-wave plate 45b, and is emitted to the second divided light polarizing beam splitter 32G. The second divided light 25 emitted to the second divided light polarizing beam splitter 32G is polarized and divided to the third polarized light 26 that is S polarized light, and the fourth polarized light 27 that is P polarized light. Then, the third light receiving unit 53G receives the third polarized light 26 and receives interfering light that is light having a phase of 90 degrees. Also, the fourth light receiving unit 54G receives the fourth polarized light 27 and receives interfering light that is light having a phase of 270 degrees. With this arrangement, a calculation unit 8 (see FIG. 2) can acquire a four-phase signal from the plurality of light receiving units 51G to 54G. By calculating this four-phase signal, the calculation unit 8 calculates and detects a moving direction of a measurement object and a variation amount in a position due to movement of the measurement object. Note that the optical sensor 1G may be an optical angle sensor or an optical length-measuring sensor.

In such an eighth embodiment, it is also possible to acquire actions and effects similar to those in the first embodiment. In addition, the following action and effect can be acquired.

(20) A light receiving unit 5G can detect a four-phase signal from combined light. Thus, by using the four-phase signal, the optical sensor 1G can highly accurately detect displacement in an angle due to a rotation of a measurement object.

Ninth Embodiment

In the following, the ninth embodiment of the present invention will be described on the basis of FIG. 13. Note that the same sign is assigned to an already-described part and a description thereof is omitted in the following description.

Figure 13:
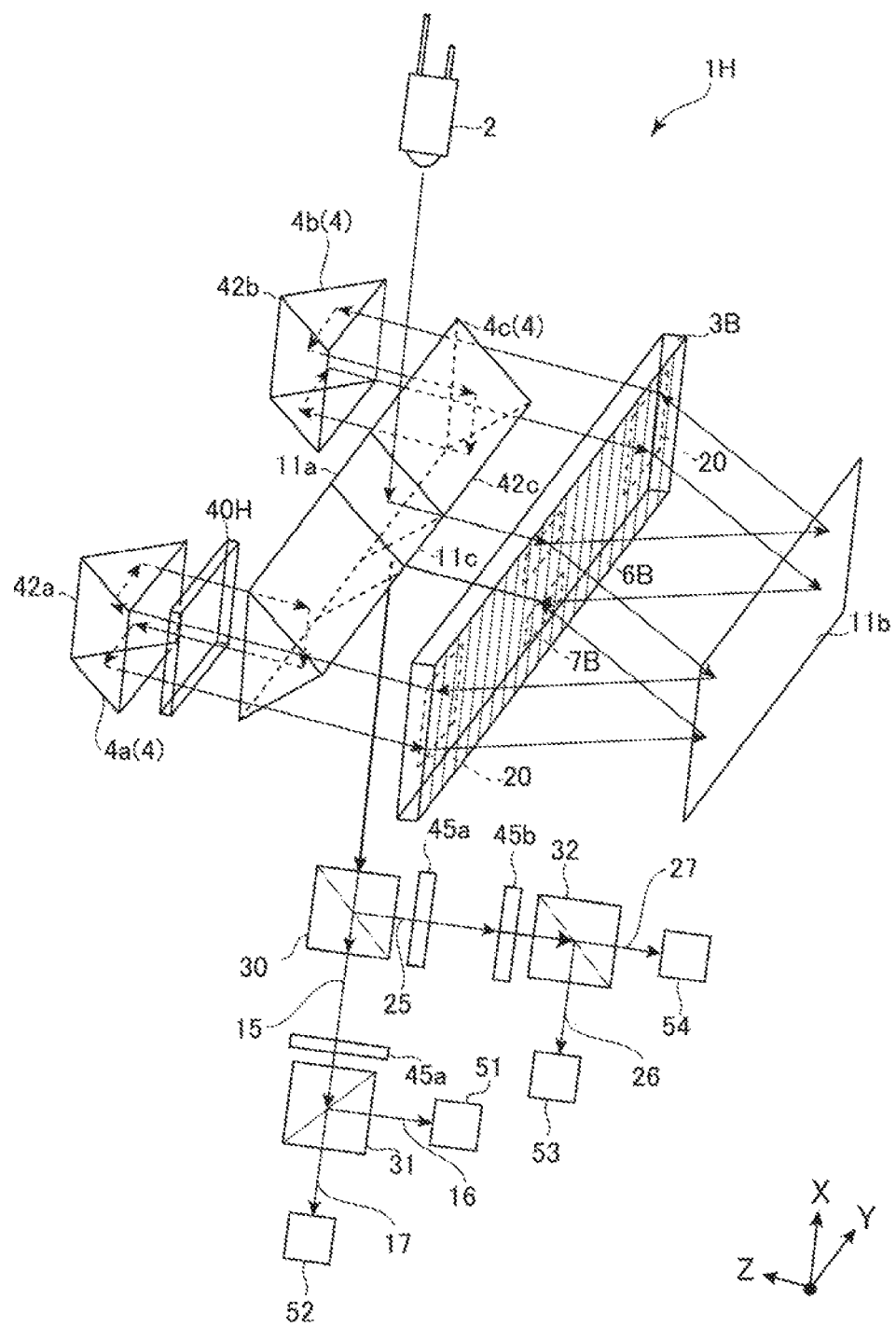
FIG. 13 is a schematic view illustrating an optical sensor according to a ninth embodiment.

FIG. 13 is a schematic view illustrating an optical sensor 1H according to the ninth embodiment.

In the eighth embodiment, the dividing unit 6G in the optical sensor 1G is the polarizing beam splitter 3G.

As illustrated in FIG. 13, in the ninth embodiment, the optical sensor 1H has a configuration substantially similar to that of the transmission-type diffraction grating 3B in the third embodiment. Also, the optical sensor 1H includes a quarter-wave plate 40H arranged in an optical path of first light through a first retroreflector 4a. The ninth embodiment is different from the eighth embodiment in these points.

Since the quarter-wave plate 40H is included, the optical sensor 1H can detect a four-phase signal by using the light receiving unit 5G in the eighth embodiment and can detect, from the four-phase signal, displacement in a position due to movement of a measurement object.

Note that the optical sensor 1H may be an optical angle sensor or an optical length-measuring sensor.

In such a ninth embodiment, it is also possible to acquire actions and effects similar to those in the third embodiment. In addition, the following action and effect can be acquired.

(21) The light receiving unit 5G can detect a four-phase signal from combined light. Thus, the optical sensor 1H can highly accurately detect, from the four-phase signal, a variation amount in a position due to movement of a measurement object by using a transmission-type diffraction grating 3B similar to that of the third embodiment and a light receiving unit 5G similar to that of the eighth embodiment.

Tenth Embodiment

In the following, the tenth embodiment of the present invention will be described on the basis of FIG. 14. Note that the same sign is assigned to an already-described part and a description thereof is omitted in the following description.

Figure 14:
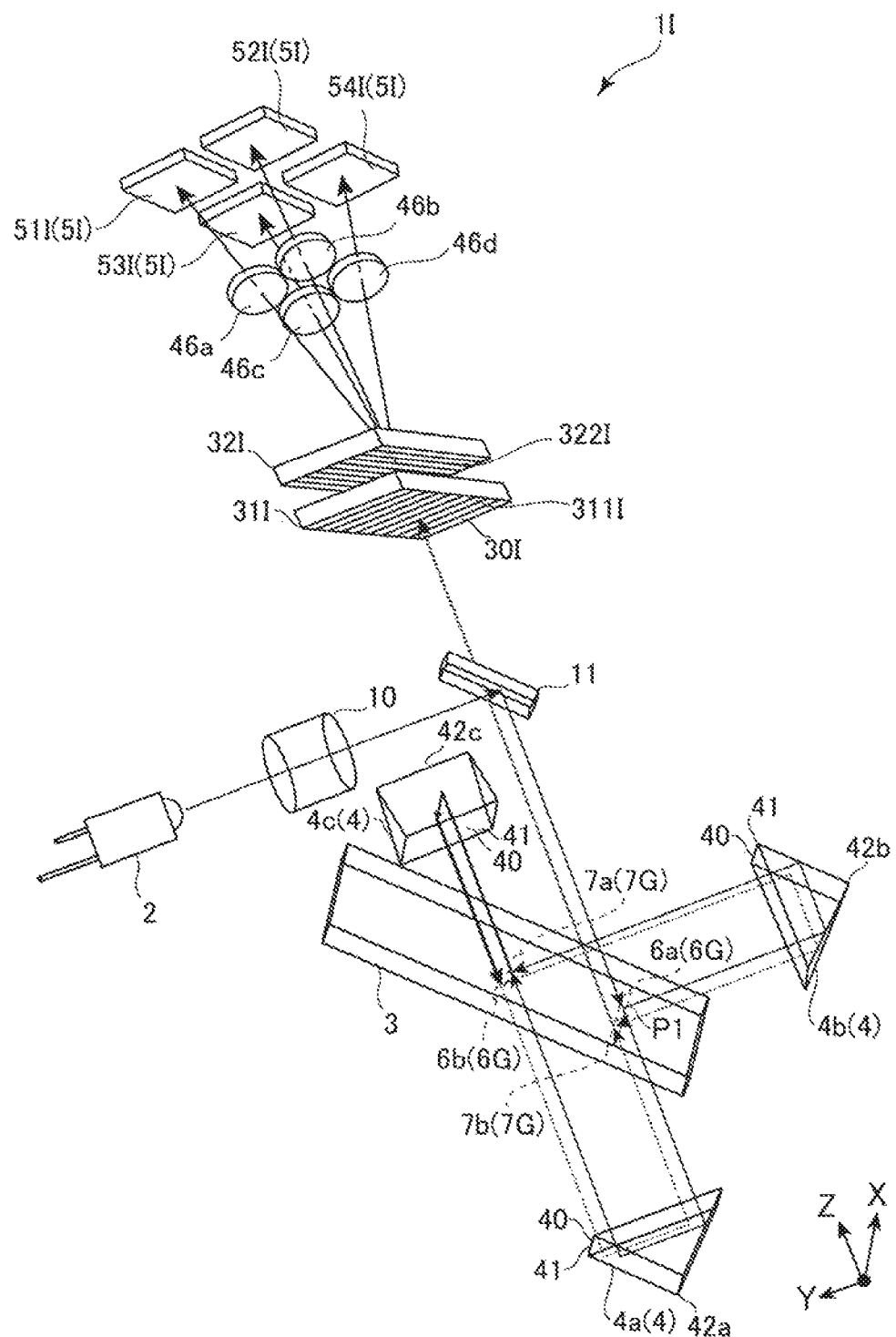
FIG. 14 is a schematic view illustrating an optical sensor according to a tenth embodiment.

FIG. 14 is a schematic view illustrating an optical sensor 1I according to the tenth embodiment.

In the eighth embodiment, the dividing unit 6G is the polarizing beam splitter 3G, and the optical sensor 1G includes the dividing beam splitter 30G, the first quarter-wave plate 45a, the second quarter-wave plate 45b, the first divided light polarizing beam splitter 31G, the second divided light polarizing beam splitter 32G, and the plurality of light receiving units 51G to 54G.

As illustrated in FIG. 14, in the tenth embodiment, the optical sensor 1I includes a first diffraction grating unit 31I having an irradiation surface 30I on which a plurality of gratings 311I that changes combined light from a combining unit 7G into a plurality of pieces of diffracted light is juxtaposed, a second diffraction grating unit 32I that has a plurality of gratings 322I juxtaposed in a direction orthogonal to a direction, in which the plurality of gratings 311I of the first diffraction grating unit 31I is juxtaposed, on the irradiation surface 30I and that further changes the plurality of pieces of diffracted light from the first diffraction grating unit 31I into a plurality of pieces of diffracted light, and a plurality of polarizers 46a to 46d that is arranged in an optical path of the plurality of pieces of diffracted light from the second diffraction grating unit 32I and that changes the plurality of pieces of diffracted light into a plurality of pieces of polarized light having different phases. A light receiving unit 51 includes a plurality of light receiving units 51I to 54I respectively corresponding to the plurality of polarizers 46a to 46d. From a plurality of signals that respectively has different phases and that is based on light received by the plurality of light receiving units 51I to 54I, a calculation unit 8 (see FIG. 2) calculates a moving direction of a measurement object and a variation amount in a position due to movement of the measurement object. The tenth embodiment is different from the eighth embodiment in these points.

Instead of dividing the combined light emitted from the combining unit 7G into S polarized light and P polarized light, the first diffraction grating unit 31I and the second diffraction grating unit 32I that are diffraction gratings divide the light into four pieces of diffracted light similarly to a case of dividing light that is not polarized on average.

The plurality of polarizers 46a to 46d are polarizing lenses and includes a first polarizer 46a, a second polarizer 46b, a third polarizer 46c, and a fourth polarizer 46d. Note that the plurality of polarizers 46a to 46d are not necessarily polarizing lenses and polarizing may be performed with anything as long as incident light can be polarized.

The light receiving unit 51 includes, as the plurality of light receiving units 51I to 54I, a first light receiving unit 51I, a second light receiving unit 52I, a third light receiving unit 53I, and a fourth light receiving unit 54I. The plurality of light receiving units 51I to 54I is provided on the same plane of the light receiving unit 51 in a manner of facing the plurality of polarizers 46a to 46d.

The plurality of pieces of light divide by the first diffraction grating unit 31I and the second diffraction grating unit 32I becomes pieces of polarized light having different phases when transmitted through the plurality of polarizers 46a to 46d.

The first light receiving unit 51I receives light that is transmitted through the first polarizer 46a and that has a phase of 0 degrees. The second light receiving unit 52I receives light that is transmitted through the second polarizer 46b and that has a phase of 90 degrees.

The third light receiving unit 53I receives light that is transmitted through the third polarizer 46c and that has a phase of 180 degrees. The fourth light receiving unit 54I receives light that is transmitted through the fourth polarizer 46d and that has a phase of 270 degrees.

With this arrangement, the calculation unit 8 can acquire a four-phase signal from the plurality of light receiving units 51I to 54I. The calculation unit 8 calculates and detects a direction of a rotation of the measurement object and a variation amount in an angle due to the rotation of the measurement object by calculating this four-phase signal.

Also, the plurality of light receiving units 51I to 54I can be modularized since being provided on the same plane of the light receiving unit 51 which plane faces the plurality of polarizers 46a to 46d. Thus, unlike the eighth embodiment, the optical sensor 1I does not need to include a plurality of light receiving units 51G to 54G in each position to which light is emitted, and it is possible to reduce a cost and a space.

Note that the optical sensor 1I may be an optical angle sensor or an optical length-measuring sensor.

In such a tenth embodiment, it is also possible to acquire actions and effects similar to those in the first embodiment. In addition, the following actions and effects can be acquired.

(22) The optical sensor 1I includes the plurality of polarizers 46a to 46d corresponding to a plurality of diffraction gratings diffracted by the first diffraction grating unit 31I and the second diffraction grating unit 32I, and the plurality of light receiving units 51I to 54I respectively corresponding to the plurality of polarizers 46a to 46d. Thus, compared to a case where the dividing beam splitter 30G, the first divided light polarizing beam splitter 31G, and the second divided light polarizing beam splitter 32G of the eighth embodiment are included, it is possible to acquire a four-phase signal without using these optical components. Thus, compared to the optical sensor 1G, it is possible to reduce a space or a cost of the optical sensor 1I while improving accuracy thereof.

(23) The light receiving unit 51 includes the plurality of light receiving units 51I to 54I that is provided on the same plane in a manner of facing the plurality of polarizers 46a to 46d and that respectively correspond to the plurality of polarizers 46a to 46d. Thus, it is possible to perform downsizing by modularizing the plurality of light receiving units 51I to 54I.

Eleventh Embodiment

In the following, the eleventh embodiment of the present invention will be described on the basis of FIG. 15. Note that the same sign is assigned to an already-described part and a description thereof is omitted in the following description.

Figure 15:
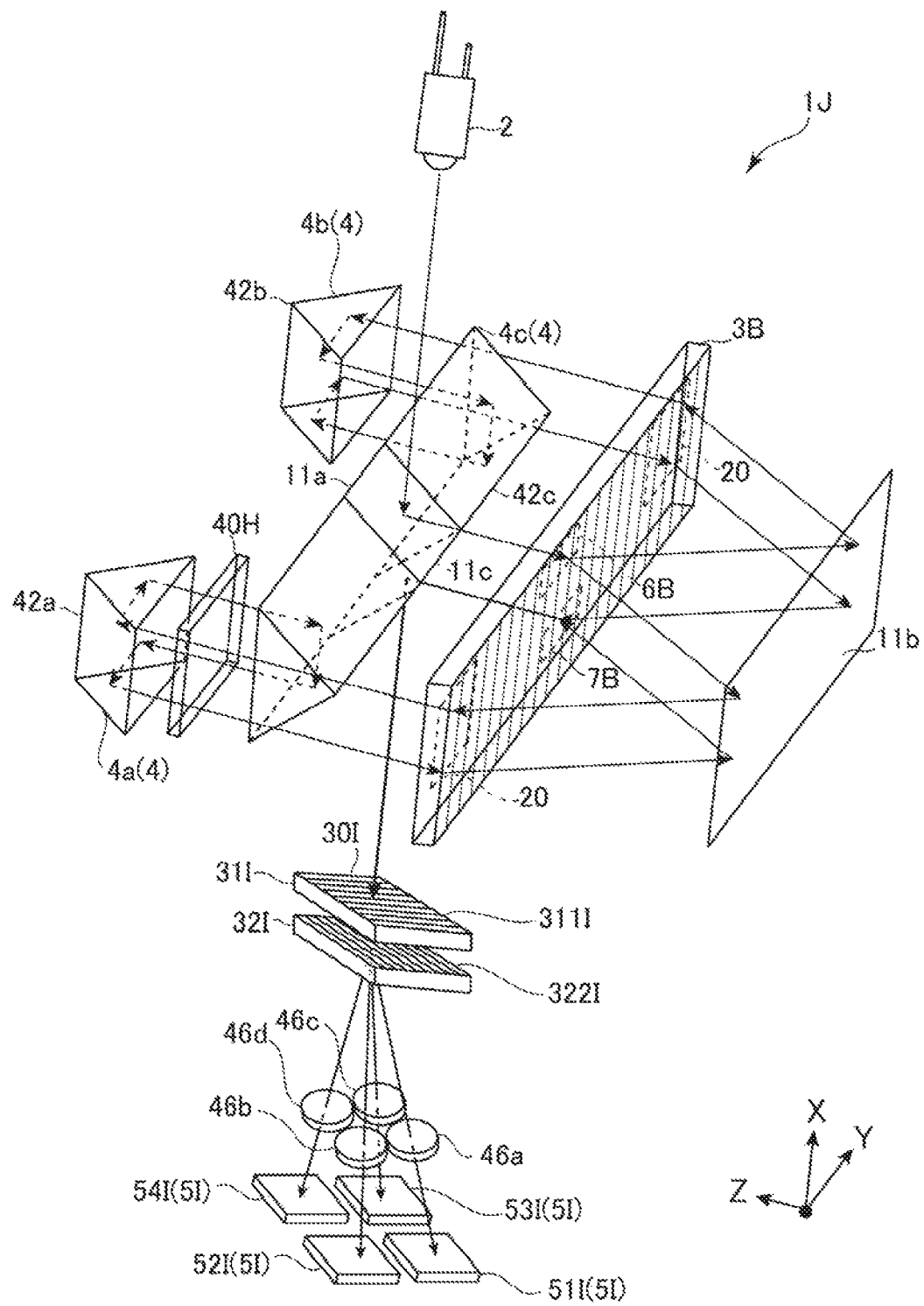
FIG. 15 is a schematic view illustrating an optical sensor according to an eleventh embodiment.

FIG. 15 is a schematic view illustrating an optical sensor 1J according to the eleventh embodiment.

In the tenth embodiment, the dividing unit 6G in the optical sensor 1I is the polarizing beam splitter 3G.

As illustrated in FIG. 15, in the eleventh embodiment, the optical sensor 1J has a configuration substantially similar to that of the transmission-type diffraction grating 3B of the third embodiment, and includes a quarter-wave plate 40H arranged in an optical path of first light through a first retroreflector 4a. The eleventh embodiment is different from the tenth embodiment in these points.

Since the quarter-wave plate 40H is included, the optical sensor 1J can detect a four-phase signal by using the light receiving unit 51 in the tenth embodiment and can detect, from the four-phase signal, displacement in a position due to movement of a measurement object.

Note that the optical sensor 1J may be an optical angle sensor or an optical length-measuring sensor.

In such an eleventh embodiment, it is also possible to acquire actions and effects similar to those in the third embodiment. In addition, the following action and effect can be acquired.

(24) Even when a dividing unit 6B includes a plurality of gratings 60, compared to a case where the dividing beam splitter 30G, the first divided light polarizing beam splitter 31G, and the second divided light polarizing beam splitter 32G of the ninth embodiment are included, it is possible to acquire a four-phase signal without using these optical components. Thus, compared to the optical sensor 1H, it is possible to reduce a space or a cost of the optical sensor 1J while improving accuracy.

Modification of Embodiment

Note that the present invention is not limited to each of the above embodiments and modification, improvement, and the like within the spirit and the scope of the present invention are included.

For example, in the above embodiments, the optical sensors 1, and 1A to 1N are provided in a measuring instrument but may be provided in a something else instead of the measuring instrument. To which the optical sensors 1, and 1A to 1N are provided is not specifically limited.

Although being a prism in each of the above embodiments, a third retroreflector 4c may be a corner cube or a glass bead-type retroreflector. That is, as a third retroreflector, any optical component can be employed as long the optical component can retroreflect first light, which is emitted from a first retroreflector, to the first retroreflector and can retroreflect second light, which is emitted from a second retroreflector, to the second retroreflector.

Figure 16:
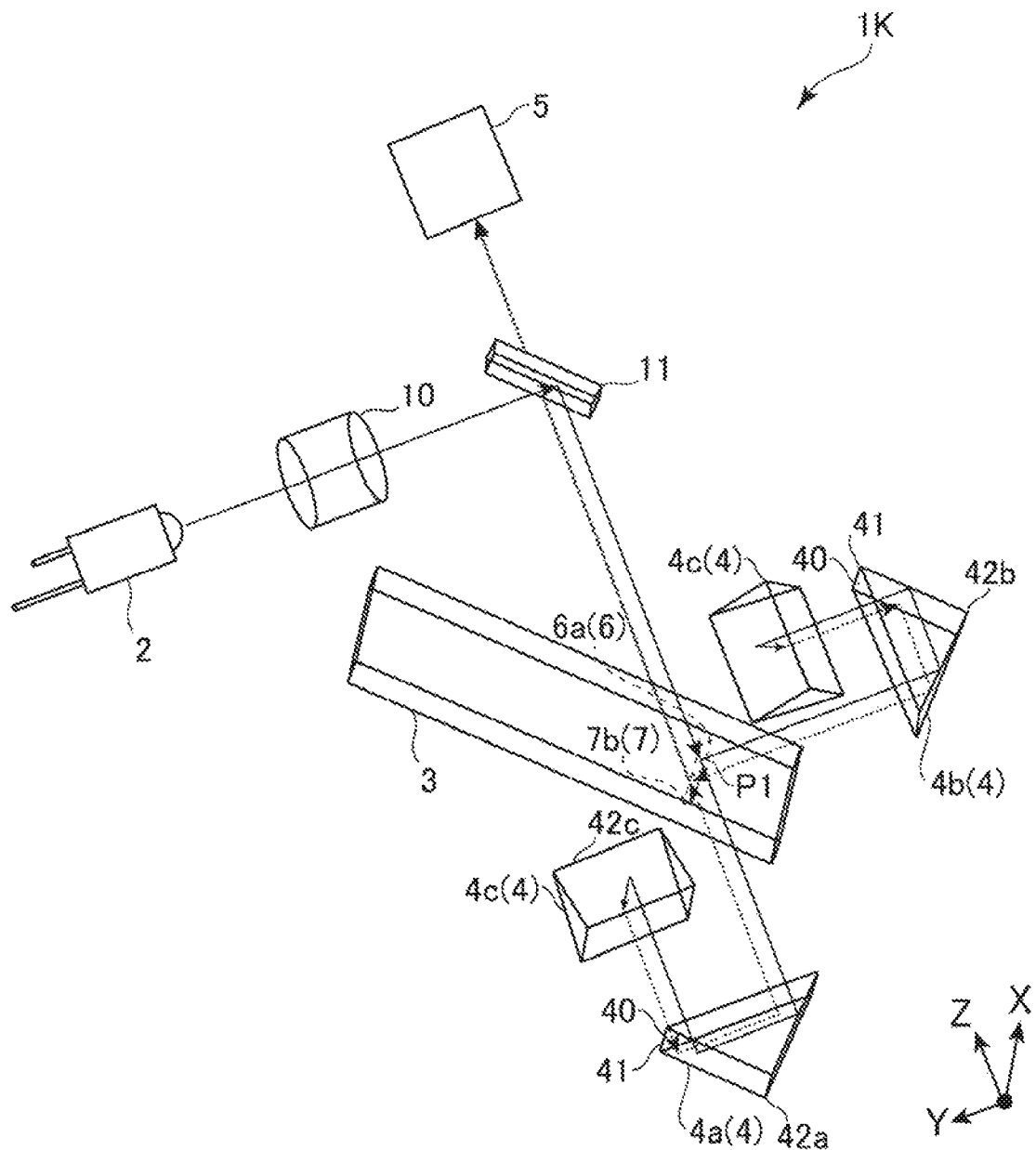
FIG. 16 is a schematic view illustrating an optical sensor according to a first modification example.
Figure 17:
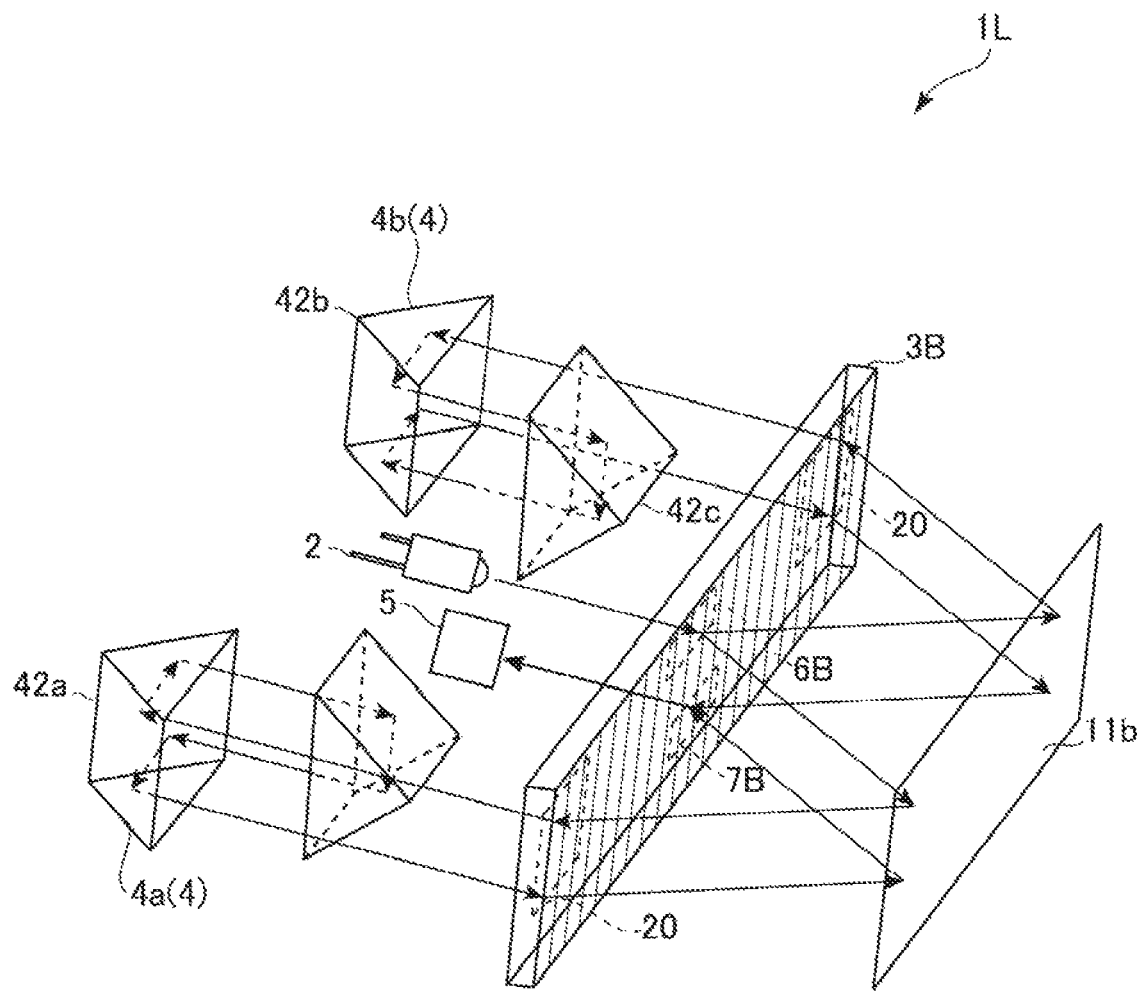
FIG. 17 is a schematic view illustrating an optical sensor according to a second modification example.

FIG. 16 is a schematic view illustrating an optical sensor 1K according to a first modification example, and FIG. 17 is a schematic view illustrating an optical sensor 1L according to a second modification example.

Although a third retroreflector 4c is one optical component in each of the above embodiments, a third retroreflector 4c may be a plurality of third retroreflector 4cK and 4cL provided in such a manner as to face a first retroreflector 4a and a second retroreflector 4b respectively in a manner of the optical sensors 1K and 1L illustrated in FIG. 16 and FIG. 17.

In each of the embodiments, a retroreflection unit 4 is arranged in such a manner that a linear direction of connection portions 42a and 42b of a first retroreflector 4a and a second retroreflector 4b and a linear direction of a connection portion 42c of a third retroreflector 4c are orthogonal to each other and that the connection portions 42a and 42b are in parallel with each other. However, connection portions 42a and 42b may not be arranged in parallel with each other. For example, in a case where connection portions 42a and 42b are arranged in such a manner as to be orthogonal to each other in FIG. 16, connection portions 42c of a plurality of third retroreflector 4cK only need to be arranged in such a manner as to be orthogonal to the connection portions 42a and 42b respectively.

Also, arrangement may not be made in such a manner that a linear direction of connection portions 42a and 42b of a first retroreflector 4a and a second retroreflector 4b and a linear direction of a connection portion 42c of a third retroreflector 4c are orthogonal to each other. Moreover, a third retroreflector 4c may not perform retroreflection in such a manner as to offset incident positions with respect to a first retroreflector 4a and a second retroreflector 4b, from emission positions of first light and second light emitted from the first retroreflector 4a and the second retroreflector 4b in first retroreflection, in an X axis direction that is a linear direction of connection portions 42a and 42b of the first retroreflector 4a and the second retroreflector 4b. That is, a third retroreflector may retroreflect first light and second light emitted in first retroreflection on a first retroreflector and a second retroreflector, from emission positions thereof, in a direction of the first light that enters the first retroreflector from a dividing unit and in a direction of the second light that enters the second retroreflector from the dividing unit, and may offset the incident positions with respect to the first retroreflector and the second retroreflector, from the emission positions, in a linear direction of connection portions of the first retroreflector and the second retroreflector.

That is, the third retroreflector only needs to be arranged in such a manner as to be able to retroreflect the first light and the second light, which are emitted in first retroreflection on the first retroreflector and the second retroreflector, in a direction of the first light that enters the first retroreflector from the dividing unit and in a direction of the second light that enters the second retroreflector from the dividing unit, to offset an incident position with respect to the first retroreflector, from an emission position, in an orthogonal direction orthogonal to the direction of the first light, and to offset an incident position with respect to the second retroreflector, from an emission position, in an orthogonal direction orthogonal to the direction of the second light.

Figure 18:
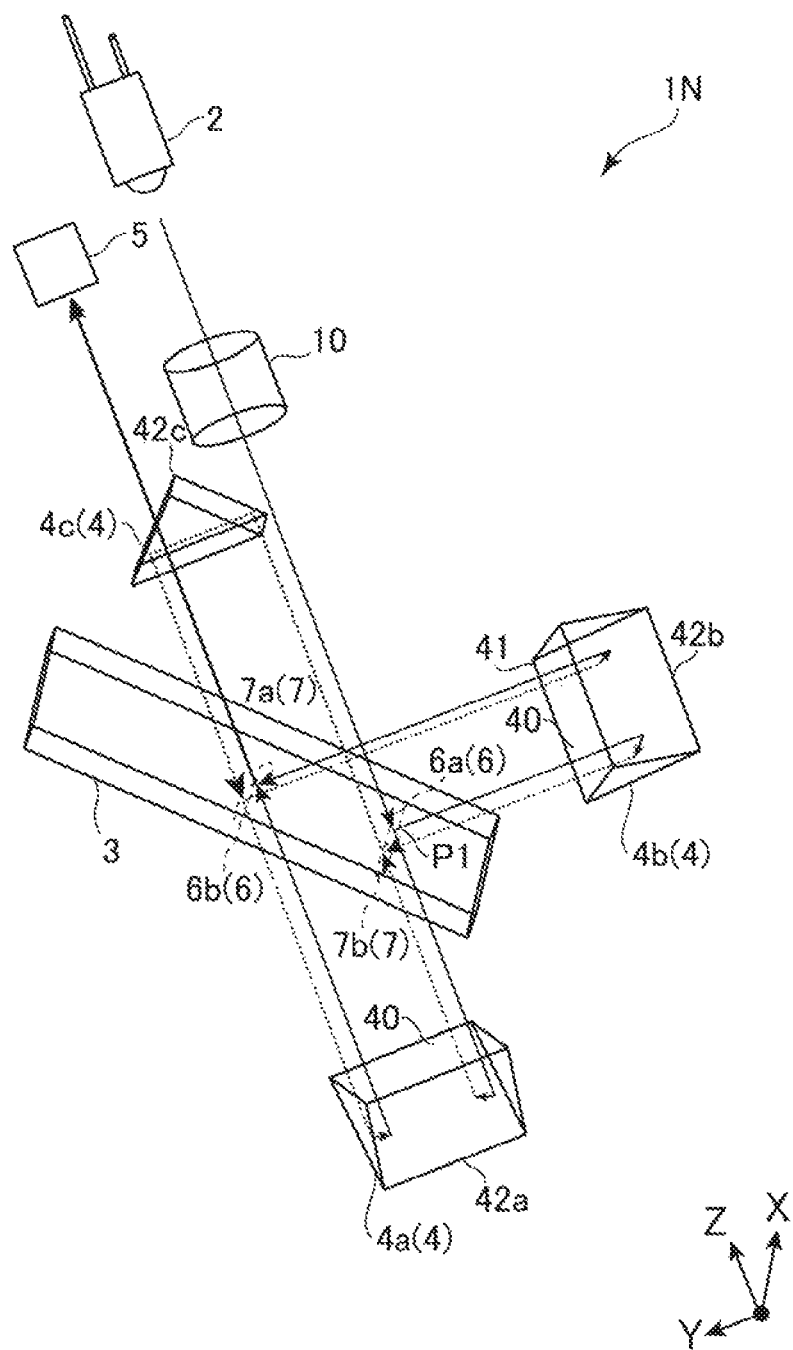
FIG. 18 is a schematic view illustrating an optical sensor according to a third modification example.

FIG. 18 is a schematic view illustrating an optical sensor 1M according to a third modification example.

In each of the above embodiments, a reflection unit 11, or a first reflection unit 11a and a third reflection unit 11c are arranged between a light source 2 and a dividing unit 6. Instead of such a configuration, as illustrated in FIG. 17 and FIG. 18, an optical sensor 1L or 1K may not include a reflection unit 11, or a first reflection unit 11a and a third reflection unit 11c, and a light source 2 may be provided in such a manner as to face a dividing unit 6 or 6B.

Figure 19:
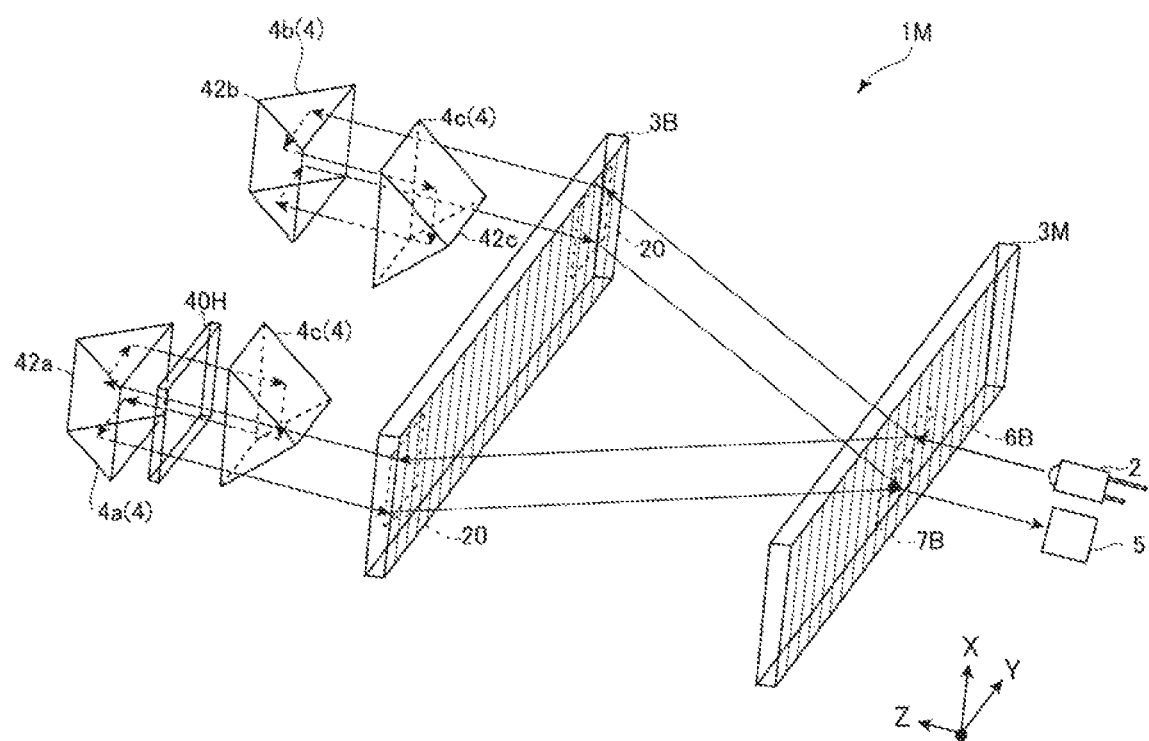
FIG. 19 is a schematic view illustrating an optical sensor according to a fourth modification example.

FIG. 19 is a schematic view illustrating an optical sensor 1N according to a fourth modification example.

Although the optical sensor 1B includes the second reflection unit lib in the third embodiment, the optical sensor 1N may not include a second reflection unit lib and may include a transmission-type diffraction grating 3bN instead as illustrated in FIG. 19.

In each of the above embodiments, a dividing unit 6 or 6B and a combining unit 7 or 7B are provided in one beam splitter 3 or one transmission-type diffraction grating 3B. However, one of a dividing unit and a combining unit may be a transmission-type diffraction grating having a plurality of gratings that diffracts light from a light source, and the other of the dividing unit and the combining unit may be a beam splitter. Also, instead of one beam splitter 3 or one transmission-type diffraction grating 3B, a plurality of dividing unit and combining unit may be provided.

In each of the above embodiments, a first retroreflector 4a and a second retroreflector 4b are attached to a measurement object and are rotated in synchronization with a rotation of the measurement object. However, one may be fixed in an optical sensor and the other may be attached to a measurement object, and a rotation may be performed in synchronization with a rotation of the measurement object.

Although the beam splitter 3 is a plate type in the first embodiment or the like, a beam splitter of an arbitrary shape such as a cube type may be employed.

INDUSTRIAL APPLICABILITY

As described above, an embodiment of the present invention can be suitably used for an optical sensor.

What is claimed is:

1. An optical sensor comprising:
a light source configured to emit light;
a dividing unit configured to divide the light from the light source into first light and second light;
a retroreflection unit configured to retroreflect the first light and the second light divided by the dividing unit;
a combining unit configured to combine the first light and the second light reflected on the retroreflection unit into combined light;
a light receiving unit configured to receive the combined light combined by the combining unit; and
a calculation unit configured to calculate a variation amount in a position of a measurement object on the basis of the combined light,
wherein the retroreflection unit includes
a first retroreflector configured to retroreflect the first light, which is divided by the dividing unit, in parallel in an opposite direction of an incident direction of the first light by performing reflection thereof twice,
a second retroreflector configured to retroreflect the second light, which is light divided by the dividing unit and different from the light reflected by the first retroreflector, in parallel in an opposite direction of an incident direction of the second light by performing reflection thereof twice, and
a third retroreflector configured to perform retroreflection in a direction different from each of a direction of the first light that enters the first retroreflector from the dividing unit and a direction of the second light that enters the second retroreflector from the dividing unit, to retroreflect the first light emitted from the first retroreflector to the first retroreflector, and to retroreflect the second light emitted from the second retroreflector to the second retroreflector,
at least one of the first retroreflector and the second retroreflector is attached to the measurement object, and
the light receiving unit receives combined light of the first light that is retroreflected twice by the first retroreflector through the third retroreflector and the second light that is retroreflected twice by the second retroreflector through the third retroreflector.

2. The optical sensor according to claim 1,
wherein the third retroreflector is one optical component that performs retroreflection in parallel in an opposite direction of the different direction, retroreflects the first light emitted from the first retroreflector to the first retroreflector, and retroreflects the second light emitted from the second retroreflector to the second retroreflector.

3. The optical sensor according to claim 1,
wherein the third retroreflector retroreflects the first light and the second light emitted in first retroreflection on the first retroreflector and the second retroreflector, by performing reflection thereof at least twice, from emission positions thereof in the direction of the first light that enters the first retroreflector from the dividing unit and the direction of the second light that enters the second retroreflector from the dividing unit, and
offsets an incident position with respect to the first retroreflector, from the emission position, in an orthogonal direction orthogonal to the direction of the first light, and offsets an incident position with respect to the second retroreflector, from the emission position, in an orthogonal direction orthogonal to the direction of the second light.

4. The optical sensor according to claim 3,
wherein the retroreflection unit includes substantially rectangular two reflectors having a reflection surface to reflect light, and a linear connection portion that orthogonally connects the two reflectors to each other, and
is arranged in such a manner that a linear direction of a connection portion of each of the first retroreflector and the second retroreflector and a linear direction of a connection portion of the third retroreflector are orthogonal to each other,
the third retroreflector retroreflects the first light and the second light emitted in the first retroreflection on the first retroreflector and the second retroreflector, by performing reflection thereof twice, from the emission positions thereof in the direction of the first light that enters the first retroreflector from the dividing unit and the direction of the second light that enters the second retroreflector from the dividing unit, and offsets the incident positions on the first retroreflector and the second retroreflector, from the emission positions, in the linear direction of the connection portions of the first retroreflector and the second retroreflector.

5. The optical sensor according to claim 1, further comprising, between the light source and the dividing unit, a reflection unit configured to reflect the light from the light source.

6. The optical sensor according to claim 1, wherein at least one of the first retroreflector and the second retroreflector is attached to the measurement object and rotates in synchronization with a rotation of the measurement object, the optical sensor being an optical angle sensor.

7. The optical sensor according to claim 6, wherein the first retroreflector and the second retroreflector are attached to the measurement object and rotate in synchronization with the rotation of the measurement object.

8. The optical sensor according to claim 1, wherein any one of the first retroreflector and the second retroreflector is attached to the measurement object, and is advanced/retracted in synchronization, in an incident direction of the light from the light source, along with movement of the measurement object, the optical sensor being an optical length-measuring sensor.

9. The optical sensor according to claim 1, wherein the first retroreflector and the second retroreflector have, in a measurement range of the measurement object, positions in which an optical length of the first light from a division point of the light, which is from the light source, in the dividing unit to the combining unit through the first retroreflector and an optical length of the second light from the division point of the light, which is from the light source, in the dividing unit to the combining unit through the second retroreflector are the same lengths.

10. The optical sensor according to claim 1, wherein the dividing unit and the combining unit are a transmission-type diffraction grating having a plurality of gratings to diffract the light from the light source, and are provided in one transmission-type diffraction grating.

11. The optical sensor according to claim 1, wherein one of the dividing unit and the combining unit is a transmission-type diffraction grating having a plurality of gratings to diffract the light from the light source, and the other of the dividing unit and the combining unit is a beam splitter.

12. The optical sensor according to claim 1, wherein the dividing unit and the combining unit are beam splitters and are provided in one beam splitter.

13. The optical sensor according to claim 1, wherein the combining unit has a combining surface to combine the first light and the second light, and includes a plurality of gratings juxtaposed in a predetermined direction on the combining surface, the light receiving unit includes a plurality of light receiving elements juxtaposed in the predetermined direction, and receives a plurality of pieces of diffracted light through the plurality of gratings, and the calculation unit calculates a variation amount in the position of the measurement object on the basis of the plurality of pieces of diffracted light received by the plurality of light receiving elements.

14. The optical sensor according to claim 1, wherein the combining unit has a combining surface to combine the first light and the second light, and includes a plurality of inclined gratings juxtaposed in a predetermined direction on the combining surface and arranged at a predetermined inclination angle with respect to an optical axis of the light from the light source, the light receiving unit includes a plurality of light receiving elements juxtaposed in an orthogonal direction orthogonal to the predetermined direction, and receives a plurality of pieces of diffracted light through the plurality of inclined gratings, and the calculation unit calculates a variation amount in the position of the measurement object on the basis of the plurality of pieces of diffracted light received by the light receiving unit.

15. The optical sensor according to claim 1, wherein the combining unit includes a plurality of combining units respectively having different phases, the light receiving unit includes a plurality of light receiving units respectively corresponding to the plurality of combining units, and the calculation unit calculates a moving direction of the measurement object and a variation amount in the position of the measurement object on the basis of pieces of light that are received by the plurality of light receiving units and that have different phases.

16. The optical sensor according to claim 1, wherein the dividing unit is a diffraction grating having a plurality of gratings, includes a quarter-wave plate arranged in an optical path of the first light or the second light, and includes a dividing beam splitter that divides the combined light from the combining unit into first divided light and second divided light, a first quarter-wave plate arranged in an optical path of each of the first divided light and the second divided light divided by the dividing beam splitter, a second quarter-wave plate arranged in an optical path of the second divided light through the first quarter-wave plate, a first divided light polarizing beam splitter that divides the first divided light through the first quarter-wave plate into first polarized light and second polarized light, a second divided light polarizing beam splitter that divides the second divided light through the second quarter-wave plate into third polarized light and fourth polarized light, and a first light receiving unit that receives light having a phase of zero degrees from the first polarized light, a second light receiving unit that receives light having a phase of 180 degrees from the second polarized light, a third light receiving unit that receives light having a phase of 90 degrees from the third polarized light, and a fourth light receiving unit that receives light having a phase of 270 degrees from the fourth polarized light.

17. The optical sensor according to claim 1, wherein the dividing unit is a diffraction grating having a plurality of gratings, includes a quarter-wave plate arranged in an optical path of the first light or the second light, and includes a first diffraction grating unit having an irradiation surface on which a plurality of gratings to change the combined light from the combining unit into a plurality of pieces of diffracted light is juxtaposed, a second diffraction grating unit that has a plurality of gratings juxtaposed in a direction orthogonal to a direction, in which the plurality of gratings of the first diffraction grating unit is juxtaposed, on the irradiation surface, and that further changes the plurality of pieces of diffracted light from the first diffraction grating unit into a plurality of pieces of diffracted light, and a plurality of polarizers that is arranged in an optical path of the plurality of pieces of diffracted light from the second diffraction grating unit, and that changes the plurality of pieces of diffracted light into a plurality of pieces of polarized light respectively having different phases, the light receiving unit includes a plurality of light receiving units respectively corresponding to the plurality of polarizers, and the calculation unit calculates a moving direction of the measurement object and a variation amount in the position of the measurement object on the basis of pieces of light that are received by the plurality of light receiving units and that respectively have different phases.

18. The optical sensor according to claim 1,
wherein the dividing unit is a polarizing beam splitter, and includes a dividing beam splitter that divides the combined light from the combining unit into first divided light and second divided light, a first quarter-wave plate arranged in an optical path of each of the first divided light and the second divided light divided by the dividing beam splitter, a second quarter-wave plate arranged in an optical path of the second divided light through the first quarter-wave plate, a first divided light polarizing beam splitter that divides the first divided light through the first quarter-wave plate into first polarized light and second polarized light, a second divided light polarizing beam splitter that divides the second divided light through the second quarter-wave plate into third polarized light and fourth polarized light, and a first light receiving unit that receives light having a phase of zero degrees from the first polarized light, a second light receiving unit that receives light having a phase of 180 degrees from the second polarized light, a third light receiving unit that receives light having a phase of 90 degrees from the third polarized light, and a fourth light receiving unit that receives light having a phase of 270 degrees from the fourth polarized light.

19. The optical sensor according to claim 1,
wherein the dividing unit is a polarizing beam splitter, and includes a first diffraction grating unit having an irradiation surface on which a plurality of gratings to change the combined light from the combining unit into a plurality of pieces of diffracted light is juxtaposed, a second diffraction grating unit that has a plurality of gratings juxtaposed in a direction orthogonal to a direction, in which the plurality of gratings of the first diffraction grating unit is juxtaposed, on the irradiation surface, and that further changes the plurality of pieces of diffracted light from the first diffraction grating unit into a plurality of pieces of diffracted light, and a plurality of polarizers that is arranged in an optical path of the plurality of pieces of diffracted light from the second diffraction grating unit and that changes the plurality of pieces of diffracted light into a plurality of pieces of polarized light respectively having different phases, the light receiving unit includes a plurality of light receiving units respectively corresponding to the plurality of polarizers, and the calculation unit calculates a moving direction of the measurement object and a variation amount in the position of the measurement object on the basis of pieces of light that are received by the plurality of light receiving units and that respectively have different phases.

* * * * *